United States Patent
Marya et al.

(10) Patent No.: US 11,820,664 B2
(45) Date of Patent: Nov. 21, 2023

(54) GRAPHENE-BASED FLUID SYSTEM COMPONENT

(71) Applicant: Schlumberger Technology Corporation, Sugar Land, TX (US)

(72) Inventors: Manuel Marya, Sugar Land, TX (US); Alireza Zolfaghari, Sugar Land, TX (US); Srinand Sreedharan Karuppoor, Sugar Land, TX (US)

(73) Assignee: Schlumberger Technology Corporation, Sugar Land, TX (US)

( * ) Notice: Subject to any disclaimer, the term of this patent is extended or adjusted under 35 U.S.C. 154(b) by 248 days.

(21) Appl. No.: 17/444,327

(22) Filed: Aug. 3, 2021

(65) Prior Publication Data

US 2023/0038707 A1  Feb. 9, 2023

(51) Int. Cl.

| | | |
|---|---|---|
| *C08L 101/12* | (2006.01) | |
| *C01B 32/184* | (2017.01) | |
| *B23K 26/00* | (2014.01) | |
| *C08K 7/00* | (2006.01) | |
| *C08K 3/04* | (2006.01) | |
| *C08J 5/00* | (2006.01) | |
| *B29C 64/188* | (2017.01) | |
| *B33Y 70/10* | (2020.01) | |
| *B23K 103/16* | (2006.01) | |
| *B82Y 30/00* | (2011.01) | |
| *B82Y 40/00* | (2011.01) | |
| *B33Y 10/00* | (2015.01) | |

(52) U.S. Cl.
CPC ........ *C01B 32/184* (2017.08); *B23K 26/0006* (2013.01); *B29C 64/188* (2017.08); *C08J 5/005* (2013.01); *C08K 3/042* (2017.05); *C08K 7/00* (2013.01); *C08L 101/12* (2013.01); *B23K 2103/16* (2018.08); *B33Y 10/00* (2014.12); *B33Y 70/10* (2020.01); *B82Y 30/00* (2013.01); *B82Y 40/00* (2013.01); *C01P 2004/24* (2013.01); *C01P 2004/64* (2013.01); *C08J 2300/22* (2013.01); *C08K 2201/011* (2013.01); *C08K 2201/013* (2013.01); *C08L 2207/04* (2013.01); *C08L 2666/55* (2013.01); *C08L 2666/72* (2013.01)

(58) Field of Classification Search
CPC ............ B23K 26/0006; B23K 2103/16; B29C 64/188; C08J 5/005; C08J 5/042; C08K 3/042; C08K 7/00; C08K 2201/011; C08K 2201/013; C08L 101/12; C08L 2207/04; C08L 2666/72; B33Y 70/10; B33Y 80/00; B82Y 30/00; B82Y 40/00; C01P 2004/24; C01P 2004/64; C01P 2300/22
USPC ......................................................... 524/496
See application file for complete search history.

(56) References Cited

U.S. PATENT DOCUMENTS

| | | |
|---|---|---|
| 10,076,875 B2 | 9/2018 | Mark et al. |
| 2007/0131915 A1 | 6/2007 | Stankovich et al. |
| 2009/0036605 A1 | 2/2009 | Ver Meer |
| 2015/0267030 A1 | 9/2015 | Nosker et al. |
| 2017/0062821 A1 | 3/2017 | Tour et al. |
| 2018/0179345 A1* | 6/2018 | Al-Harthi ................. C08J 5/18 |
| 2019/0088420 A1 | 3/2019 | Tour et al. |

FOREIGN PATENT DOCUMENTS

| | | |
|---|---|---|
| WO | 2016133571 A2 | 8/2016 |
| WO | 2018125096 A1 | 7/2018 |

OTHER PUBLICATIONS

J. Lin, Z. Peng, Y. Liu, F. Ruiz-Zepeda, R. Ye, E. L. Samuel, M. J. Yacaman, B. Yakobson and J. M. Tour, "Laser-Induced porous graphene films from commercial polymers," Nature Communications, pp. 1-8, 2014.
Robert J. Young, Mufeng Liu, Ian A. Kinloch, Suhao Li, Xin Zhao, Cristina Valles, Dimitrios G. Papageorgiou, "The Mechanics of Reinforcement of Polymers by Graphene Nanoplatelets," Composite Science and Technology 154, pp. 110-116, 2018.
Zhang et al., "Additive manufacturing of green ceramic by selective laser gasifying of frozen slurry", Journal of the uropean Ceramic Society. 37. 10.1016/j.jeurceramsoc. 2017.02.040 (2017) pp. 2679-2684.
Pan et al., Use of Failure Analysis Techniques to Improve Reliability by Material Selection in SAGD Applications, Society of Petroleum Engineers (SPE), Gulf Coast Selection Electric Submersible Pump Workshop, Woodlands, Texas, 2011 (7 pages).
International Search Report and Written Opinion of PCT Application PCT/US2022/037776 dated Nov. 3, 2022, 13 pages.

* cited by examiner

*Primary Examiner* — Hannah J Pak
(74) *Attorney, Agent, or Firm* — Trevor G. Grove

(57) ABSTRACT

A fluid system component can include a body that includes a multidimensional shape defined in orthogonal directions and layers stacked along one of the orthogonal directions, where at least one of the layers includes polymeric material and graphene nanoplatelets formed in situ from the polymeric material, and where the graphene nanoplatelets increase stiffness of the polymeric material.

14 Claims, 15 Drawing Sheets

System 1400

GRAPHENE-BASED FLUID SYSTEM COMPONENT

BACKGROUND

Various types of fluid system components can be utilized in fluid transport, fluid control, fluid operations, etc. For example, a pipe can be utilized for fluid transport, a valve can be utilized for fluid control, and a pump can be utilized for fluid operations. As an example, a reservoir can be a subterranean reservoir that includes fluid where various types of fluid system components may be utilized at the surface or below the surface (e.g., subsurface or subterranean). Where a borehole is drilled into a subterranean environment, which may include a reservoir, various types of fluid system components may be utilized at the surface of the borehole, if the borehole extends to the surface, and various types of fluid system components may be utilized downhole, for example, positioned in the borehole a depth or depths from the surface using one or more types of operations (e.g., rig, wireline, pump-down, etc.). In various environments (e.g., offshore, onshore, reservoir, etc.), one or more fluid system components may be exposed to water as a fluid at an exterior surface (e.g., fresh water, salt water, formation water, etc.) and one or more fluids (e.g., water, oil, gas, etc.) at an interior surface.

SUMMARY

A fluid system component can include a body that includes a multidimensional shape defined in orthogonal directions and layers stacked along one of the orthogonal directions, where at least one of the layers includes polymeric material and graphene nanoplatelets formed in situ from the polymeric material, and where the graphene nanoplatelets increase stiffness of the polymeric material. A method can include depositing polymeric material; selectively exposing the polymeric material to an energy beam; responsive to the exposing, converting at least a portion of the polymeric material to graphene nanoplatelets; and depositing additional material on the graphene nanoplatelets to form at least a portion of a component.

This summary is provided to introduce a selection of concepts that are further described below in the detailed description. This summary is not intended to identify key or essential features of the claimed subject matter, nor is it intended to be used as an aid in limiting the scope of the claimed subject matter.

BRIEF DESCRIPTION OF THE DRAWINGS

Features and advantages of the described implementations can be more readily understood by reference to the following description taken in conjunction with the accompanying drawings.

DETAILED DESCRIPTION

Figure 1:
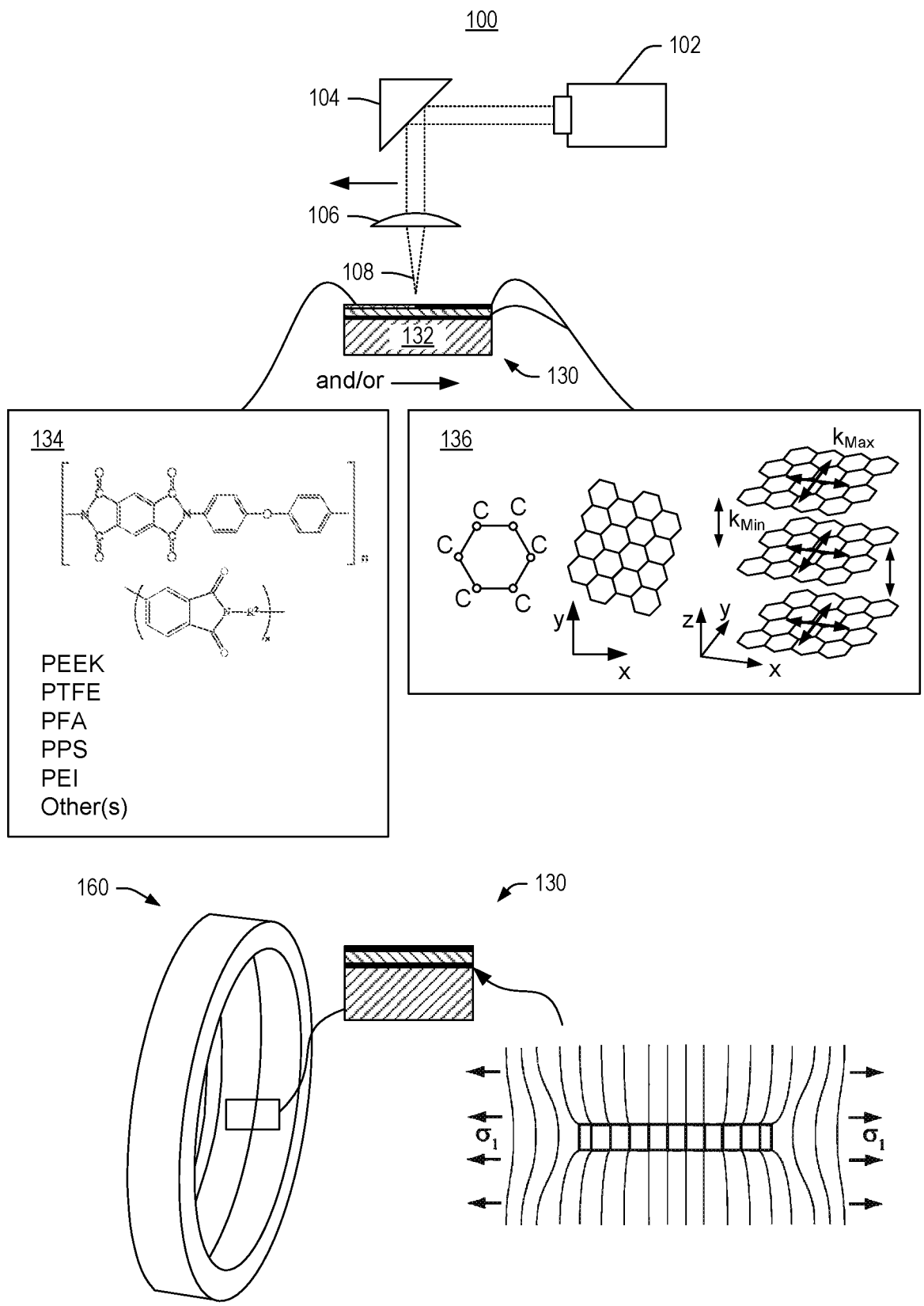
FIG. 1 illustrates an example of a system for making an example of a composite and an example of a component.

The following description includes the best mode presently contemplated for practicing the described implementations. This description is not to be taken in a limiting sense, but rather is made merely for the purpose of describing the general principles of the implementations. The scope of the described implementations should be ascertained with reference to the issued claims.

Graphene can alter properties of composite materials where such composite materials include one or more polymers where contact can exist between graphene and a polymer or polymers. For example, graphene nanoplatelets (GNPs) can reinforce a polymeric matrix. An article by Young et al., "The mechanics of reinforcement of polymers by graphene nanoplatelets", https://doi.org/10.1016/j.compscitech.2017.11.007, is incorporated by reference herein. The Young article describes a mechanism of stress transfer in polymeric matrices reinforced by graphene nanoplatelets (GNPs) where the GNPs are not formed in situ; rather, the GNPs are obtained as exfoliated graphite nanoplatelets sold as product M25 by XG Sciences (East Lansing, Michigan) where "M" refers to the grade (average thickness of approximately 6 to 8 nanometers, surface area of 120 to 150 $m^2/g$ and available in average particle diameters of 5, 15 or 25 microns). The M grade GNPs of XG Sciences are reported to have a tensile modulus of 1,000 MPa parallel to surface and a tensile strength of 5 MPa parallel to surface along with Raman spectroscopic peaks of approximately 1580 $cm^{-1}$ and 2700 $cm^{-1}$.

As an example, a method for additive manufacture of a component (e.g., a part) can include generation of graphene in situ, which may or may not include addition of already formed graphene. Such a method can be utilized to build a component (e.g., a part) using an additive manufacturing technique where the method includes generating graphene in situ where in situ generated graphene can be formed and/or integrated in a manner that tailors properties of the component. In such an approach, the component can be suitable for use in the oil and gas industry. For example, consider a component that can be utilized in a downhole environment. In such an example, the component may be part of a tool, part of a completion, etc. As explained, a component can be a fluid system component (e.g., suitable for use in the oil and gas industry, etc.). As an example, properties of in situ generated graphene can be tailored, for example, via deposition of laser energy and/or other beam energy during additive manufacture, such that the in situ generated graphene is of a desirable form, which may be characterized using one or more techniques (e.g., microscopy, spectroscopy, etc.). The form or forms, positions, etc., may be determined a priori and be part of an instruction set, a control scheme, a controller, etc., for additive manufacture of a component or components.

As an example, in situ graphene may be formed to reinforce a material matrix where, for example, the material matrix includes polymer, reinforcement increases with strong graphene-polymer interfaces and aligned nanoplatelets with high aspect ratios; noting that, with low levels of graphene, graphene-reinforced polymers may be modeled using classical composite micromechanics; whereas, for higher levels, one or more other models may be employed.

GNPs can be integrated with one or more types of polymers. For example, consider melt-processible thermoplastic elastomer (TPE) that can include partially cross-linked, chlorinated olefin interpolymer alloy, polypropylene (PP) homopolymer, etc.

As mentioned, GNPs can be provided as an isolated stock material and/or can be generated in situ. For example, as to stock material, consider exfoliated GNPs produced by sulphuric intercalation of graphite. Such GNPs can have an average thickness of 6 nm to 8 nm (e.g., approximately 20 graphene layers). A definition for a GNP may be based on a number of graphene layers, for example, consider a GNP as being defined as including more than 10 graphene layers in thickness.

As to GNPs generated in situ, consider laser induced graphene (LIG), which has been shown to generate GNPs that can be less than 20 graphene layers. An article by Lin et al., Laser-induced porous graphene films from commercial polymers, Nat Commun 5, 5714 (2014) (https://doi.org/10.1038/ncomms6714), which is incorporated by reference herein, describes a one-step, scalable approach for producing and patterning porous graphene films with three-dimensional networks from polymer films using a $CO_2$ infrared laser. In such an approach, the sp3-carbon atoms are photothermally converted to sp2-carbon atoms by pulsed laser irradiation where resulting laser-induced graphene (LIG) exhibits high electrical conductivity. In the article by Lin, the LIG is patterned to interdigitated electrodes for in-plane micro supercapacitors with specific capacitances of greater than 4 mF cm$^{-2}$ and power densities of approximately 9 mW cm$^{-2}$ as a potential rapid route to polymer-written electronic and energy storage devices.

The Lin article involves irradiating a commercial PI film by a $CO_2$ infrared laser under ambient conditions. Thus, the Lin article utilizes stock PI film and the Young article utilizes stock GNPs. As explained, a method can include employing an additive manufacture technique where an energy beam is additionally employed to selectively generate graphene in situ to manufacture a component with properties that are tailored by the selective generation of graphene in situ.

As an example, during additive manufacture of a component, a technique such as laser scribing may be utilized to form LIG in situ. Such a technique may be utilized for generating GNPs from one or more types of polymeric material. In various instances, LIG films can be porous structures, for example, due to liberation of gas, and/or flakes. As an example, LIG flakes can include disordered-grain boundaries and may include curvature that can add to porous structure. Where a laser is utilized in a scanning manner, power and scan rate (e.g., speed, duration, etc.) can impact LIG formation; noting that a minimum amount of power delivery may be specified for LIG formation. As an example, a technique may include adjusting power and/or speed of a laser or lasers where, for example, higher power and/or slower speed may foster LIG formation in desired regions, patterns, etc. Power can also relate to porosity where, for example, higher power can lead to increased porosity; noting that too high of power can degrade certain characteristics of LIG (e.g., consider oxidation of LIG in air). LIG can be a photothermal process where photothermal effects cause LIG formation (e.g., consider localized temperatures that may be in excess of 2,500 degrees C., which may break C—O, C=O and N—C bonds).

LIG can be generated from various types of polymers. For example, consider a polymer that includes one or more aromatic units such as polyimide (PI) and poly(etherimide). In the Lin article, LIG films made from PI and poly (etherimide) were dominated by sp2-carbons where thin LIG flakes had few-layer features while thicker LIG flakes had mesoporous structures. TEM images showed various structures including pentagon, hexagon and heptagon.

As an example, an additive manufacturing process can include generation of LIG where such LIG can include GNPs that can alter properties of a composite material. As an example, LIG can be made to be thin, thick, porous or non-porous. As an example, LIG can be made in a manner to be relatively isolated (e.g., as a layer) and/or can be made in a manner to facilitate contact with one or more polymeric materials. For example, consider formation of porous LIG where polymer may occupy at least some of the pore space, consider mixing of a layer of LIG with a polymeric material, etc. As an example, a process can include utilizing one or more emitters where, for example, one may emit energy to form LIG and where another may emit energy to initiate and/or otherwise control polymerization of one or more polymers, monomers, etc. (e.g., consider ultraviolet radiation, heat, heat and humidity, etc.).

Fused filament fabrication (FFF) is a type of additive manufacture process that utilizes a continuous filament of a thermoplastic material where a phase change can occur. Various additive manufacture process can include polymerization such as, for example, photocuring where radiation can initiate and/or otherwise control polymerization. As to LIG, as explained, it can chemically convert a material such as, for example, a polymer to graphene.

As an example, a LIG technique can provide for desirable alignment of GNPs and can provide for reduced agglomeration of GNPs, where desired. For example, in a mixing-based approach that relies on already formed GNPs, alignment and/or agglomeration may be difficult to control and/or demand one or more particular processing techniques that aim to achieve desirable alignment and/or reduced agglomeration (e.g., an acceptable level of agglomeration).

As an example, a LIG technique can provide for desirable aspect ratios of GNPs, which may be within a distribution that can be characterized via mean, standard deviation, etc., where aspect ratio can be a parameter to tailor the stiffness of a composite material that includes GNPs and polymeric material.

As an example, a LIG technique can provide for a desirable level of loading of GNPs in a composite material. For example, loading may be controlled via an additive manufacturing process where polymer(s) can be converted to GNPs via utilization of one or more lasers when making a composite material, which may be directly and/or indirectly fashioned into a component suitable for use in the oil and gas industry. For example, consider making a stock composite material that then may be cut, machined, etc. (e.g., optionally via laser cutting, laser ablation, etc.) to an appropriate shape for use as a component in the oil and gas industry.

Some examples of polymers that can be altered as to theirs stiffness by GNPs include epoxy resin (ER), TPE, polypropylene (PP), nitrile rubber (NBR) and natural rubber (NR).

As an example, a method can form graphene in situ as part of an additive manufacturing process for a component suitable for use in the oil and gas industry where the component is a composite material.

As an example, a polymeric or partially polymeric part with either uniform or three-dimensions evolving material(s) can be constructed using an extrusion-type additive technology in combination with one or more thermal sources (e.g., laser, E-beam, etc.), the latter being used to locally produce graphene in discrete, semi-continuous, or continuous fashion via proper scanning. In such an example, the in situ graphene may aim to strengthen a component and/or otherwise control one or more physical properties.

As an example, a method can include in situ generation of graphene within an additive manufactured component with custom designed layer-by-layer features across the part, which may be gradated spatially. As an example, a component may be a component suitable for use as a flow conduit (e.g., tubular goods, pipes, coupling stocks), a downhole zone isolation plug (e.g., hydraulic fracturing balls/plugs, cementing ball/plugs, packer structural parts, sealing elements, liner hangers, etc.), a window (e.g., for nuclear sensing, etc.), a rod pump, a shaft pump, a centralizers (e.g., for position control, etc.), etc.

As an example, a polymeric material can be printed. For example, consider one or more of a relatively pure polymeric material and/or polymeric mixture. As an example, polymeric material may include one or more of PI, PEEK, PEI, TPE, an elastomer (e.g., radiation/photo curable, etc.), along with one or more examples of materials that can develop graphene following short and energetic exposures (e.g. laser, discharge plasma, etc.).

As an example, a method that includes additive manufacturing and in situ generation of graphene may make a component that is formed as a green component that is later processed. For example, consider an article by Zhang et al., "Additive manufacturing of green ceramic by selective laser gasifying of frozen slurry", Journal of the European Ceramic Society. 37. 10.1016/j.jeurceramsoc.2017.02.040 (2017), which is incorporated by reference herein. The Zhang article describes a slurry-based additive manufacturing (AM) technique for green ceramic that includes freezing a layer of aqueous ceramic slurry, laser gasifying of the frozen-layer ice to process 2D green ware, and removing the support in water to release the 3D ceramic part. Via suitable laser power and scanning speed, the approach can yield a layer that has a thickness of 90 μm, a cantilever structure with a wall thickness of 115 μm and a span of 30 mm without deflection. The casting layer cannot be damaged by using a cryopanel to rapidly freeze the slurry, and redundant frozen materials can be melted in water without swelling. The process can rapidly form a solid support and has a high removal efficiency.

As explained, a laser or other radiation emitter (e.g., an E-beam, etc.) can be utilized for one or more purposes to make an application ready component, a component for further processing, etc., where the component includes in situ formed graphene such as graphene in the form of GNPs.

As an example, a method can provide for enhanced component manufacture with lesser waste of material, lesser waste of energy, lesser use of potentially unfriendly chemicals, potentially unfriendly metals, etc. A component may be characterized by one or more enhanced operational limits (e.g., higher temperature, higher mechanical properties, etc.), greater thermal extraction, among others.

As explained, a method can be implemented to produce a polymeric part with uniform or three-dimensions evolving materials using additive manufacturing in combination with one or more thermal sources (e.g., thermal, radiation, etc.), with the latter to produce graphene in discrete, semi-continuous or continuous fashion. As explained, a thermal source may also be a photoactive source such that a wavelength or wavelengths of energy have a photochemical effect (e.g., consider polymerization initiation, polymerization quenching, etc.). As an example, a radiation source may be suitable for use in controlling a polymerization reaction. For example, consider utilization of heat energy and/or a particular wavelength (e.g., UV, etc.), optionally along with one or more other factors (e.g., humidity, etc.) that may have an effect on a polymerization reaction.

As an example, a method can include depositing a material, referred as precursor material (for subsequent at least in part transformation into graphene). As to additive manufacturing processes, consider material deposition/extrusion additive manufacturing that involves loading and liquefaction of a precursor material or materials, moving the material(s) through a nozzle or orifice by applying force or pressure, plotting liquefied material according to a pre-defined path in a controlled manner, deposition of powdered material layer by layer, and bonding of the material to itself layer by layer or a secondary build material to form a coherent solid structure. After a layer is completed, in such an example, the build platform moves down or the extrusion head moves up, and a new layer of material is deposited and adhered onto the previous layer. In such an example, where desired, one or more support structures can be included in the process to enable the fabrication of one or more desirable geometrical features.

Additive manufacturing technologies can include, for example, binder jetting, material jetting, material extrusion, powder bed fusion, direct energy deposition, etc. Additive manufacturing (AM) can provide for production of complex parts without a shaping tool other than a die with a simple geometry, generally round.

FIG. 1 shows an example of a system 100 that can be utilized to manufacture at least a portion of a component 160. As shown, the system 100 includes an electromagnetic (EM) energy generator 102, which may be a laser, an electron beam generator, a plasma generator, etc. Where the EM energy generator 102 generates a beam, the beam may be directed using one or more elements. For example, for a laser, consider a mirror 104 and a lens 106 where the lens 106 can focus a beam 108 onto a material 134 as part of a composite 130 for conversion of the material 134 to graphene 136. In such an example, the composite 130 can include a support body 132 that can support one or more other materials (e.g., the material 134, the graphene 136, etc.).

In the example of FIG. 1, the material 134 may be or may include polyimide and/or one or more other polymers. In FIG. 1, some example structures of aromatic polyimide are shown where aromatic rings are present in units that are repeated. As explained, one or more materials (e.g., the material 134, etc.) can be converted at least in part to graphene, some example structural features thereof being illustrated in FIG. 1. For example, graphene includes carbon rings that can form substantially planar sheets where sheets may optionally be formed as stacked sheets. When stacked, properties may differ depending on orientation. For example, heat conductivity may differ for in-plane and inter-plane directions where in-plane heat conductivity ($k_{Max}$) is greater than inter-plane heat conductivity ($k_{Min}$).

In graphene, carbon atoms may be arranged in a hexagonal manner, due to sp2 bonding, as a crystalline allotrope of carbon (e.g., as a large aromatic molecule). Graphene may be described as being a one-atom thick layer of graphite and may be a basic structural element of carbon allotropes such as, for example, graphite, charcoal, carbon nanotubes and fullerenes. In FIG. 1, the illustrations for the material 136 show a carbon ring along with a layer of graphene and layers of graphene, which may be described, for example, with respect to a Cartesian coordinate system (x, y, z).

Graphene can be characterized as a zero-overlap semimetal (with both holes and electrons as charge carriers) with very high electrical conductivity. Carbon atoms have a total of 6 electrons; 2 in the inner shell and 4 in the outer shell. The 4 outer shell electrons in an individual carbon atom can be available for chemical bonding, but in graphene, each atom is connected to 3 other carbon atoms on the two dimensional plane, leaving 1 electron freely available in the third dimension for electronic conduction. These highly-mobile electrons are called pi ($\pi$) electrons and are located above and below a graphene sheet. These pi orbitals overlap and help to enhance the carbon to carbon bonds in graphene. Fundamentally, the electronic properties of graphene are dictated by the bonding and anti-bonding (the valance and conduction bands) of these pi orbitals.

In the example of FIG. 1, the material 134 may be or may include one or more polymers (e.g., polymeric materials), including one or more of the materials shown, which can include one or more of polyimide (PI), PEEK, PTFE, PFA, PPS, PEI, and one or more other polymers.

PEEK tends to exhibit high resistant to downhole environments and can be readily sprayed onto a metallic surface. PEEK may also be used in one or more types of coatings, which may optionally include one or more ceramics to tailor physical properties. For example, a ceramic may be included in a composite material with one or more polymers to provide a harder and more abrasion resistant component. As to types of ceramics, consider one or more ceramic pigments such as titania, cobalt or nickel oxides, etc. As an example, with PTFE addition or boron nitride ceramic, lubricity of a composite material may be reduced.

As mentioned, a polymeric material can be a polyimide. Polyimides (PI) are high-performance polymers of imide monomers that include two acyl groups (C=O) bonded to nitrogen (N). PIs can exhibit high temperature performance, for example, in a range of 400 degrees C. to 500 degrees C. PIs can also be resistant to various chemicals.

Polyimides can exist as thermosetting PIs and as thermoplastic PIs. Depending upon the constitution of their main chain, PIs can be classified as aliphatic, aromatics, semi-aromatics thermoplastics and thermosets. Aromatic polyimides may be derived from an aromatic dianhydride and diamine. Semi-aromatic ones can include one or more monomer aromatics (e.g., dianhydride or diamine is aromatic, and another part is aliphatic). Aliphatic polyimides can include polymers formed as a result of the combination of aliphatic dianhydride and diamine.

Various PIs are infusible and insoluble due to their planar aromatic and hetero-aromatic structures and thus, where desired, may be processed from a solvent route.

As an example, a polymeric material can be characterized at least in part by a dielectric constant. For example, KAPTON™ polyimide film (marketed by E. I. Du Pont de Nemours and Company, Wilmington, Delaware) can be characterized by a dielectric constant that can depend on humidity where the dielectric constant increases with respect to increasing relative humidity (RH), for example, from about 3 to about 4 for an increase from about 0 percent RH to about 100 percent RH (e.g., for a 1 mil film of KAPTON® type HN polymer). Such water-related changes in properties are due to polyimide films being formed by condensation reactions. Polyimide, when exposed to water, can degrade via hydrolytic attack. The kinetics of hydrolytic degradation can depend on temperature and pressure as well as, for example, presence of other constituents in an environment.

As an example, a polyimide may be converted to graphene where graphene is more robust in that it does not experience hydrolytic degradation as does polyimide. Where graphene is formed in a layer of polyimide, it may be adjacent to polyimide, optionally in a manner supported by polyimide. As an example, where water exposure occurs, such water may be utilized beneficially to degrade polyimide via hydrolytic attack in a manner that degrades support for graphene.

As an example, where a component may be in an aqueous environment where water may reach polyimide, one or more barrier materials may be utilized to protect the polyimide from hydrolytic attack. For example, a lead (Pb) or bismuth (Bi) layer can be a barrier layer that acts to protect polyimide. For example, a lead (Pb) layer can reduce permeation of water, $H_2S$, $CO_2$ or one or more other constituents that can degrade polyimide and/or otherwise impact its dielectric properties (e.g., ability to insulate a conductor, which may be a graphene conductor or another type of conductor). While lead (Pb) and bismuth (Bi) are mentioned as examples of types of barrier material, one or more other types of barrier materials may be utilized, which may be, for example, one or more of metallic material, ceramic material, and polymeric material.

As to the EM energy generator 102 and conversion of material to graphene, the Lin article describes a one-step, scalable approach for producing and patterning porous graphene films with three-dimensional networks from polymer films using a $CO_2$ infrared laser. In such an approach, the sp3-carbon atoms are photothermally converted to sp2-carbon atoms by pulsed laser irradiation where resulting laser-induced graphene (LIG) exhibits high electrical conductivity. In the article by Lin, the LIG is patterned to interdigitated electrodes for in-plane micro supercapacitors with specific capacitances of greater than 4 mF cm$^{-2}$ and power densities of approximately 9 mW cm$^{-2}$ as a potential rapid route to polymer-written electronic and energy storage devices.

In FIG. 1, the example component 160 may be of a particular shape where a portion thereof includes the composite 130.

As an example, the component 160 may be formed in a manner that has physical properties that help to reduce scaling and/or release scale (e.g., responsive to application of pressure, etc.). As an example, the component 160 may be manufactured to have variable stiffness such that one region changes in response to pressure than another region. In such an example, when the component 160 is exposed to pressure, the different responses of the different regions can help to break scale as the scale may experience heterogeneous strain that may crack the scale.

Scale can be a deposit or coating formed on a surface of material, which may be a metallic material, rock, etc. Scale can be caused by one or more processes. For example, consider one or more of precipitation due to a chemical reaction with a surface of material, precipitation caused by one or more chemical reactions, a change in pressure, a change in temperature, a change in composition of a solution, etc. As an example, scale may be formed via a corrosion process (e.g., a corrosion process, etc.). As to types of chemicals that may form or be in scale, consider one or more of calcium carbonate, calcium sulfate, barium sulfate, strontium sulfate, iron sulfide, iron oxides, iron carbonate, various silicates and phosphates and oxides, various compounds insoluble or slightly soluble in water, etc.

As an example, scale can be a mineral salt deposit that may occur on tubing or other components as saturation of produced water is affected by changing conditions. Scale may create a restriction, or even a plug, in tubing. As to removal of scale, various types of mechanical, chemical and/or scale inhibitor treatment options may be available.

As to how scale may affect the composite 130, consider a reduction in pressure from fluid flowing past a surface of the component 160 as scale may be relatively rigid and hinder deformation of material in the composite 130 as the scale can be further supported by the composite 130. For example, as scale adheres and builds on such a surface, the scale may have a Young's modulus (e.g., elasticity modulus) that is large such that the effect of fluid pressure on a deformable material is reduced. Where the composite 130 has a non-uniform stiffness, its deformation may be non-uniform, which, in turn, may cause cracking of scale in regions where deformation of the composite 130 is increased, which may be within a surface region. Once a portion of the scale is cracked, the remaining portions may be less supported and flake off (e.g., upon exposure to flow, etc.). Such a descaling process may be aided in part by addition of one or more chemicals (e.g., fluid treatments, etc.).

As an example, a component can include a graphene region (e.g., optionally as layered coatings) where a method of manufacture can, for example, utilize polymer spray coatings, combined with localized thermal scans (e.g. laser, E-beam, micro plasmas, etc.) to form graphene (e.g., GNPs, porous graphene, etc.). As to such a component, it may include a support body where a method of manufacture can include, for example, application of one or more coatings to one or more surfaces of the support body. As an example, a component may include a skin polymer that may be, for example, one or more of PEEK, PEK, PTFE, PEI, PPS, PFA, etc.

As explained with respect to FIG. 1, one or more polymers may be utilized, which may include one or more of PI, PEEK, PTFE, PFA, PPS, PEI and one or more other polymers. In such an example, one or more of the polymers may be converted at least in part to graphene.

As to physical properties of the component 160, FIG. 1 shows an example of stress transfer from a matrix to an individual aligned GNP where subjected to axial stress, $\sigma_1$, parallel to the plane of the nanoplatelet. As shown, lines become distorted as the Young's modulus of the matrix is less than that of the nanoplatelet, which induces a shear stress at the nanoplatelet/matrix interface. The axial stress in the nanoplatelet will build up from zero at the nanoplatelet ends to a maximum value in the middle of the nanoplatelet. If the nanoplatelet is long enough, the strain in the middle of the nanoplatelet equals that of the matrix. As nanoplatelets can have a much higher Young's modulus than a matrix, the nanoplatelets can carry a substantial amount of the load in a composite (e.g., composite material).

As explained, a graphene pattern can be substantially two-dimensional or may be three-dimensional (e.g., a geometric pattern defined using one or more dimensions, etc.).

For example, consider a 2D graphene pattern that is parallel to a surface of a component and a 3D graphene pattern that is normal to a surface. As an example, the component 160 may include one or more of 2D and 3D patterns to tailor the stiffness of the component 160 for one or more purposes. As mentioned, stiffness may be tailored at a surface to help break scale while stiffness may be tailored in a particular direction of applied stress, for example, to increase stiffness of the component (e.g., consider in a radial direction of the component 160). In such examples, an AM process may aim to form graphene in situ with appropriate size, shape, alignment, porosity, mixing, etc., to achieve tailored characteristics of a component.

Figure 2:
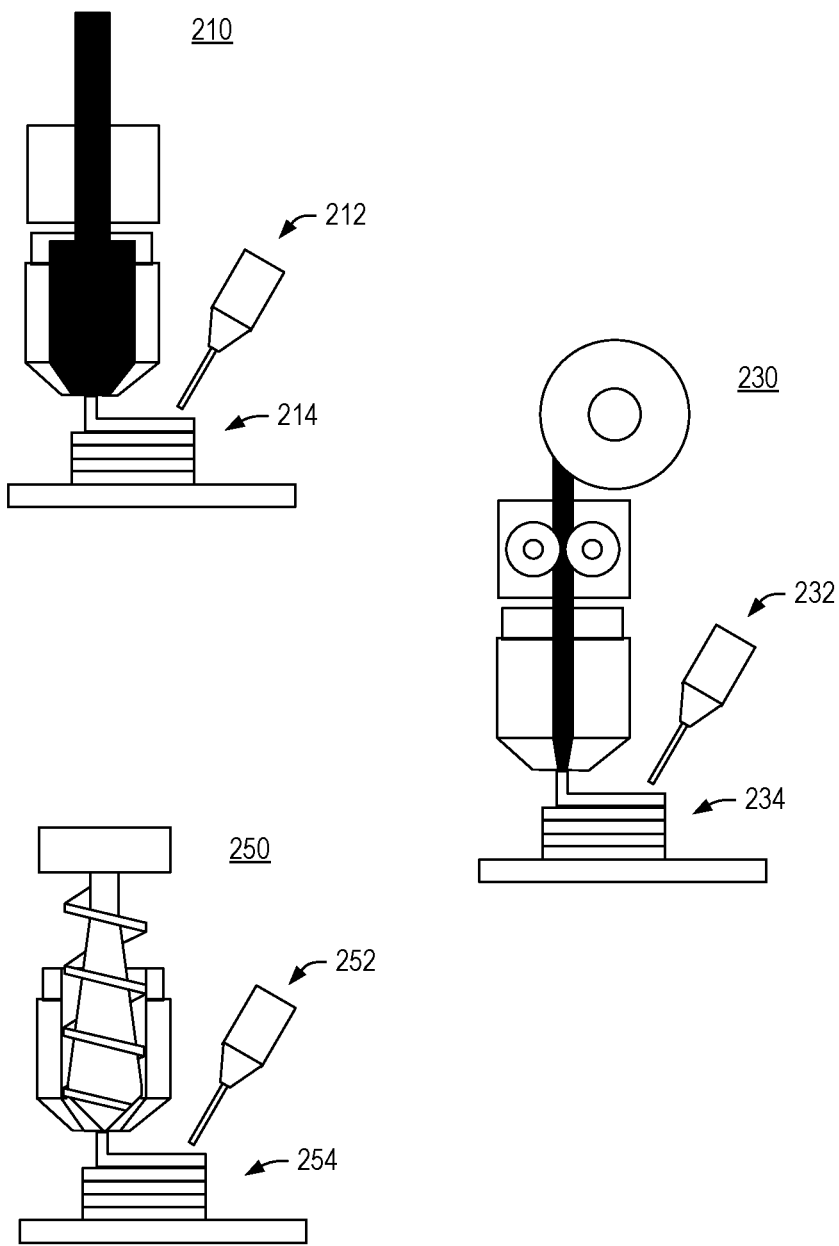
FIG. 2 illustrates examples of equipment for forming a component.

FIG. 2 shows some example AM processes 210, 230 and 250. The AM process 210 can be a plunger-based AM process, the AM process 230 can be a filament-based AM process and the AM process 250 can be a screw-based AM process. As shown, a localized heat source 212, 232 and 252 may be utilized to direct energy at a product 214, 234 and 254 that is being manufactured to convert deposited material into graphene.

As explained, a method can include tailoring properties of parts via in situ generation of graphene in additive manufacture (AM). As mentioned, LIG may be employed to generate graphene where LIG tends to be relatively thin; however, it can be incorporated into a composite material where the presence LIG can affect one or more resulting properties of the composite material.

Techniques can be employed to incorporate LIG into a composite material that can be in the form of a part. A portion of a part may be tailored (e.g., reinforced) while another portion of the part may be without tailoring or may be deliberately weakened (e.g., via holes, materials, extent of polymerization, etc.). For parts that dissolve, surfaces that are contact surfaces may be enhanced via incorporation of LIG, while still being dissolvable.

As an example, an additive manufacture process can utilize a laser where a beam of the laser can be aimed at a material and generate heat. In such an example, characteristics of the material and/or surrounding material can be taken into account; noting that the beam may be of a duration, power, wavelength, size, etc., that acts to localize heat generated for purposes of forming LIG without substantial impact on surrounding material. As an example, a method can include applying beam energy to a material after at least some amount of change has occurred between a time of deposition of the material via additive manufacture and a time of application of the beam energy. For example, a polymerization may occur to a certain percentage before applying beam energy.

As an example, an AM process may aim to maintain LIG relatively undisturbed. For example, consider depositing polymeric material on LIG in a "gentle" manner. As example, consider tailoring polymerization and/or hardening of a polymeric material (e.g., may harden quickly or may harden slowly). In such an example, viscosity of the polymeric material and/or orientation with respect to gravity may cause creep, flow, etc., which may lead to penetration into LIG (e.g., consider porous LIG). As explained, polymerization may be controlled in one or more manners. For example, consider polymeric material that may be polymerized upon exposure to UV radiation.

As an example, an AM process may aim to disturb LIG. For example, consider polymeric material that may be deliberately jetted at the LIG to disturb the LIG. Such an approach may aim to alter orientation of GNPs, increase intimate contact between GNPs and polymeric material, etc.

As an example, an AM process may deposit polymeric material that may be hot enough or otherwise chemically active to melt a layer that is beneath LIG to disturb the LIG. As an example, an AM process may utilize a brush or other tool that can be controllably passed over LIG or LIG/polymer to cause mix, particular orientations, etc. For example, consider a micro brush that can be dragged over a layer in a particular direction that can result in increased orientation of GNPs in that direction. As an example, an orientation technique may utilize one or more electromagnetic fields and/or magnetic fields, where, for example, one or more materials may flow, orient and/or try to orient responsive to the presence of the one or more fields. As an example, gravity may be utilized to cause a material to flow and/or orient. As mentioned with respect to FIG. 1, the orientation of a platelet can alter the stiffness of a composite material (e.g., a composite matrix).

As explained, a laser may be a multiple use laser in an AM process. For example, consider a laser that can be utilized for LIG and one or more other purposes, heating (e.g., fusion, etc.), initiating polymerization, subtraction (e.g., ablation, cutting, drilling, etc.), etc.

As to AM process, a method may employ, for example, one or more of photo polymerization (vat photopolymerization, e.g., UV polymerization), powder bed fusion (e.g., laser fusion, E-beam fusion, etc.), binder jetting, material extrusion, directed energy deposition, material jetting and sheet lamination.

Figure 3:
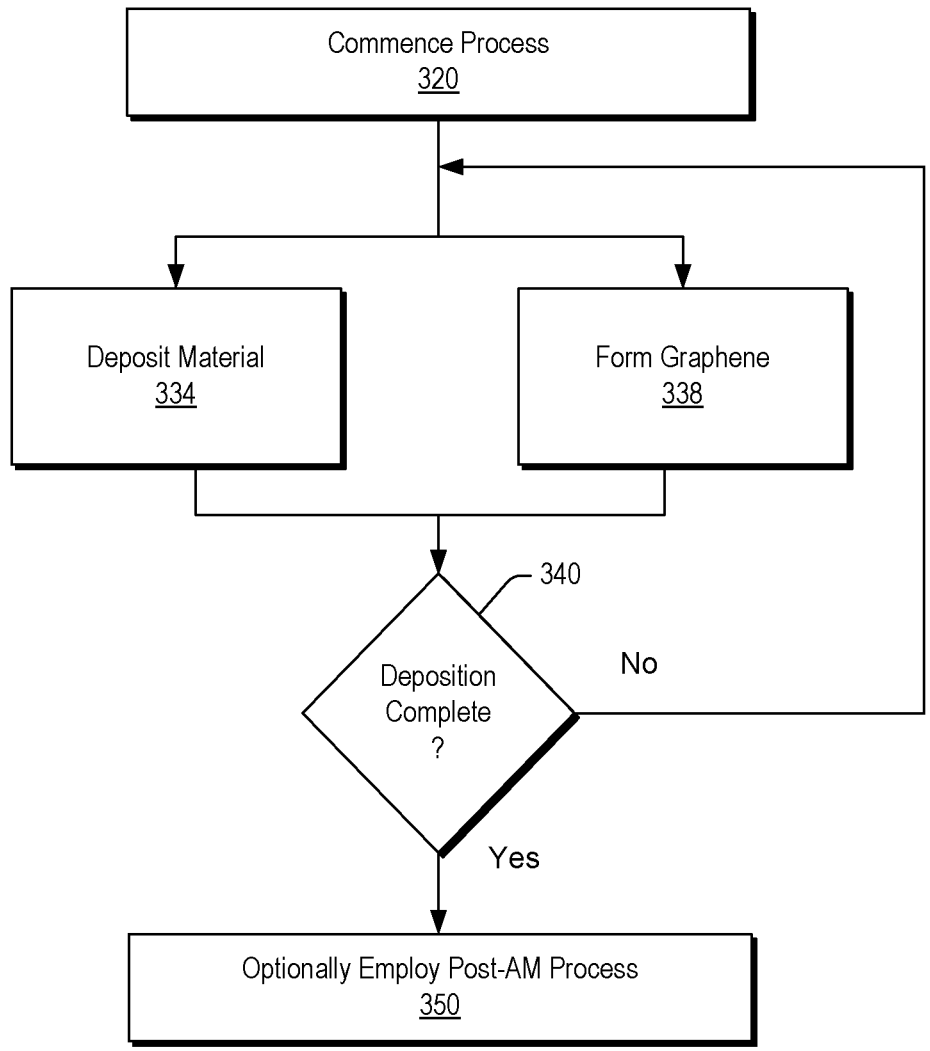
FIG. 3 illustrates an example of a method.

FIG. 3 shows an example of a method 310 that includes a commencement block 320 for commencing a process, a deposition block 334 for depositing material, a formation block 338 for forming graphene from deposited material, a decision block 340 for deciding whether deposition is complete and an optional post-AM process block 350 for employing one or more post-AM processes (e.g., a heat cycle, a pressure cycle, a machining process, a spray process, etc.).

As an example, a component (e.g., a part) may be manufactured to tailor one or more properties of the component. For example, consider an approach that aims to tailor behavior as related to physical phenomena that a component may be exposed to during deployment, use, etc. In such an example, a component may be tailored to be less likely to fail.

As an example, a method can include generation of a virtual model of a component where the virtual model may be subject to analysis using a simulation framework, etc. In such an example, the virtual model may provide for guiding an additive manufacturing process. For example, consider a stress analysis framework that can determine stress patterns in a component where the component can be tailored spatially by inclusion of graphene to alter stress patterns, component integrity, etc. In such an example, a user may identify particular stress patterns and call for inclusion of graphene that can be generated in situ during an additive manufacturing process that involves directing an energy beam or beams at deposited material to convert at least a portion of the deposited material to graphene.

An article by Pan et al., Use of Failure Analysis Techniques to Improve Reliability by Material Selection in SAGD Applications, Society of Petroleum Engineers (SPE), Gulf Coast Selection Electric Submersible Pump Workshop, Woodlands, Texas, 2011, is incorporated by reference herein. In the Pan article, a sleeve of an electric submersible pump (ESP) was analyzed with respect to fatigue at operational temperatures. In particular, defect investigation and failure analysis were performed, combined with Finite Element Analysis (FEA) simulation and experimental verification to reproduce and predict the failure mode. A numerical model developed on the basis of Theoretical Elasticity showed that the failure mode was prompted by axial thermal stress caused by differences in the coefficient of thermal expansion (CTE) of components in a shaft string coupled with pump construction. The Pan article fit experimental crack-temperature data to numerical simulation results where the model was able to predict the failure mode in sleeves such that a validated numerical model provided for screening of suitable alloys for components in the shaft string to reduce the thermal stress. As an example, a FEA simulation approach such as that of the Pan article can be integrated into a workflow for a component that can be manufactured using an additive manufacture technique supplemented with one or more energy beams to form graphene in situ.

Parameters such as Young's modulus, Poisson's ratio, CTE, etc., can be included in a model analysis of a component, an assembly, etc. A model analysis may involve one or more of temperature, pressure, chemical environment, contact(s) with one or more other components, cycling, operations, etc.

Figure 4:
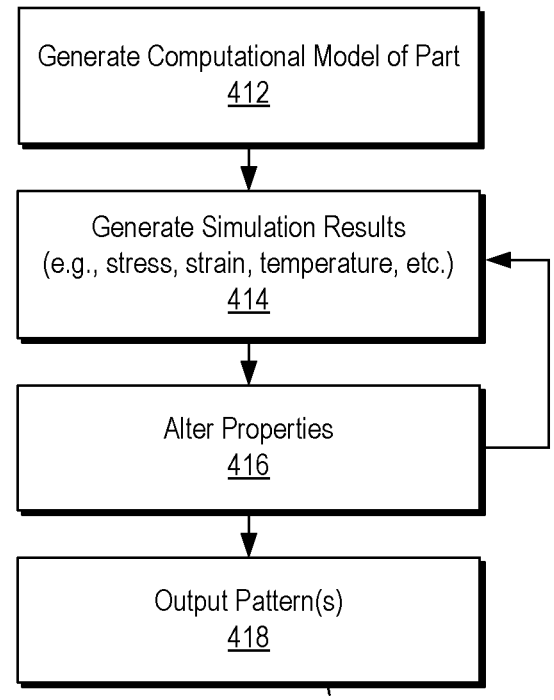
FIG. 4 illustrates an example of a method and examples of patterns of graphene.
Figure 4:
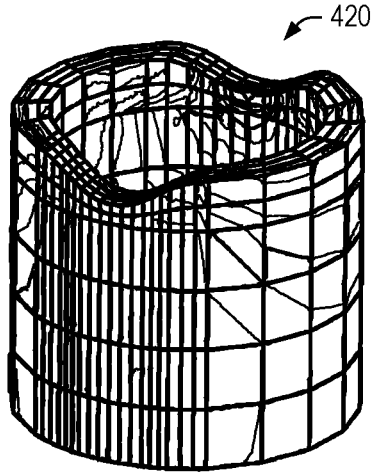
Figure 4:
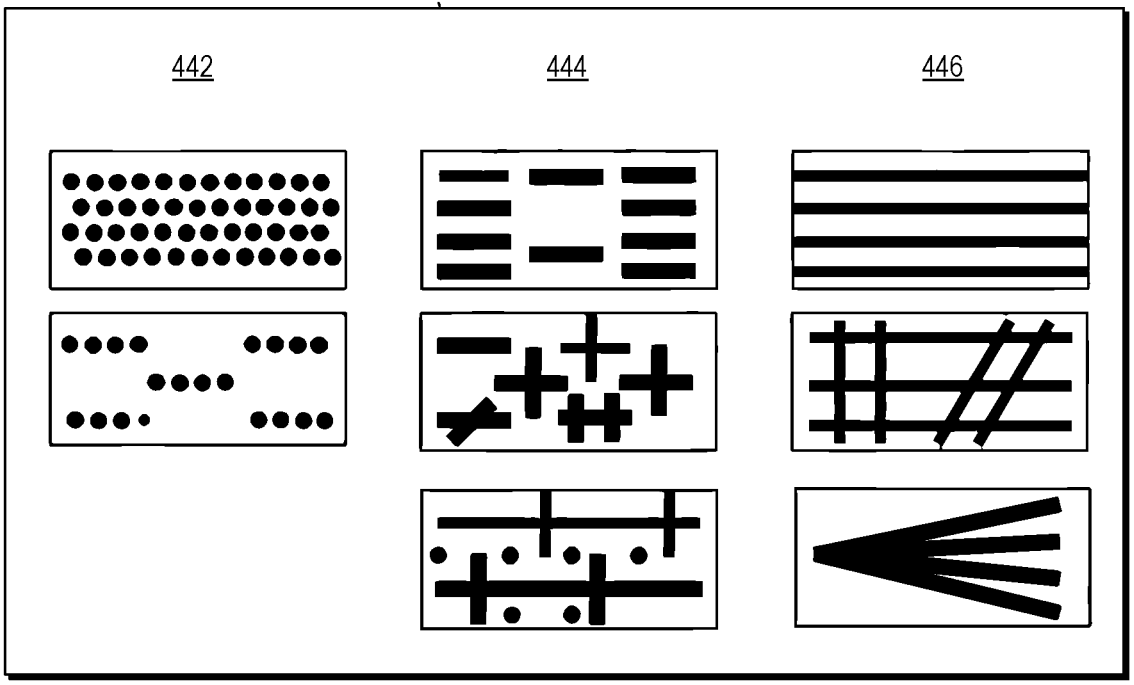

FIG. 4 shows an example of a method 410, an example of a virtual component 420 and various examples of graphene patterns 442, 444 and 446 (e.g., geometric patterns). As shown in the example 442, a precursor may be deposited where discrete graphene-rich clusters may be formed using a laser pulse at particular locations. As shown in the example 444, one or more semi-continuous graphene-rich clusters may be formed (e.g., using a laser scan, etc.). As shown in the example 446, one or more continuous graphene-rich clusters may be formed (e.g. using a continuous laser scan). As explained with respect to FIG. 1, graphene can include GNPs where platelets can alter stiffness of a matrix. In the examples of FIG. 4, stiffness may be altered (e.g., tailored) according to one or more types of patterns.

As shown in FIG. 4, the method 410 can include a generation block 412 for generating a computational model of a part (see, e.g., the virtual component 420, which may be a mesh-based model suitable for computational analysis with respect to one or more physical phenomena, etc.), a generation block 414 for generating simulation results (e.g., stress, strain, temperature, etc.), an alteration block 416 for altering one or more properties of the computational model of the part (e.g., the virtual component 420, etc.), and an output block 418 for outputting a pattern or patterns, which may be in the form of a virtual model with a particular pattern or patterns embedded therein. For example, the virtual model 420 can include one or more elements therein that are specified to be of a material that is to be converted to graphene. In such an example, the one or more elements may define a geometric pattern that aims to tailor physical properties of a component as represented by the virtual model 420. As shown in the example of FIG. 4, the method 410 may include one or more loops such as, for example, a loop between the blocks 414 and 416, which may be utilized to tailor a part for particular behavior, which may be with respect to an operating range or ranges for one or more of temperature, pressure, stress, strain, dissolvability, etc.

Figure 5:
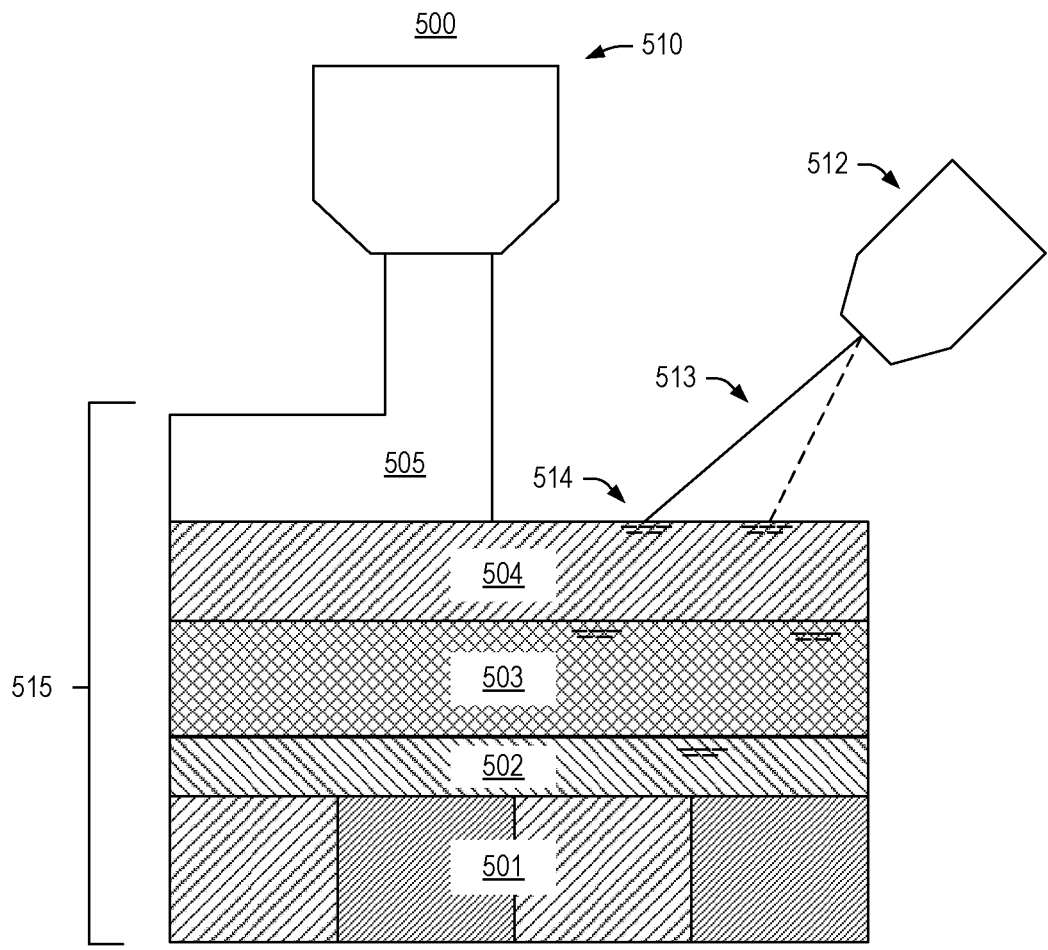
FIG. 5 illustrates an example of a system and an example of a method.
Figure 5:
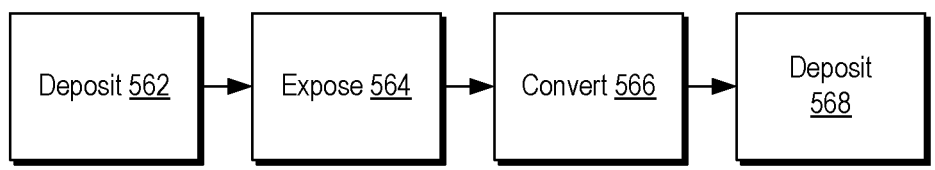

FIG. 5 shows an example of a system 500 and an example of a method 560. As shown, the system 500 can be utilized for an AM process that includes simultaneous material deposition (e.g., using one or more heads) and localized heating to induce formation of graphene (e.g., using one or more heads). As shown, a component or stock component material may be built in layers 501, 502, 503, 504 and 505 using one or more types of polymeric material. The layers may be of uniform or variable thickness. As shown, AM equipment 510 and energy beam equipment 512 can be utilized where the energy beam equipment 512 can provide for localized heat deposition to generate graphene 514 in situ from polymeric material in a layer or layers. As shown, the energy beam equipment 512 can provide one or more energy beams 513, which may be independently directed.

In the example of FIG. 5, a body 515 may be formed that includes various layers (see, e.g., one or more of the layers 501, 502, 503, 504, 505, etc.) and graphene (see, e.g., the graphene 514).

Figure 6:
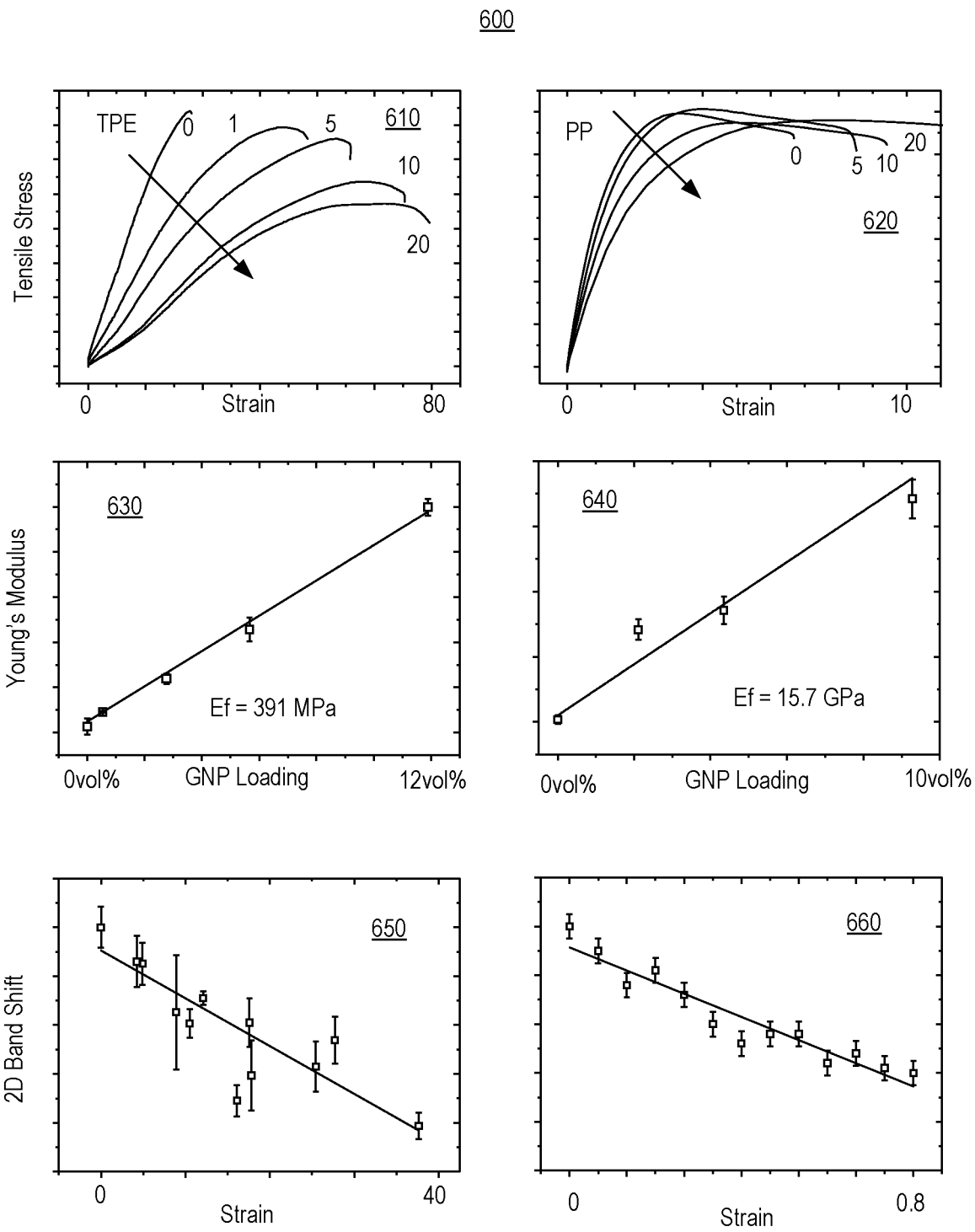
FIG. 6 illustrates examples of plots of graphene enriched polymeric materials.

As an example, a fluid system component can include a body such as the body 515 where the body includes a multidimensional shape defined in orthogonal directions (e.g., x, y and z of a Cartesian coordinate system, etc.) and layers (see, e.g., the layers 501, 502, 503, 504, 505, etc.) stacked along one of the orthogonal directions, where at least one of the layers includes polymeric material and graphene nanoplatelets (see, e.g., the graphene 514, etc.) formed from the polymeric material, and where the graphene nanoplatelets increase stiffness of the polymeric material (see, e.g., the method 410 of FIG. 4, the plots 600 of FIG. 6, etc.).

In FIG. 5, the method 560 can include a deposition block 562 for depositing polymeric material; an exposure block 564 for selectively exposing the polymeric material to an energy beam; a conversion block 566 for, responsive to the exposing, converting at least a portion of the polymeric material to graphene nanoplatelets; and a deposition block 568 for depositing additional material on the graphene nanoplatelets to form at least a portion of a component. In such an example, the depositing may utilize one or more polymeric materials and selectively exposing may include exposing one or more of the one or more polymeric materials to an energy beam or energy beams. As an example, the method 560 may be implemented using one or more features of the system 500. As an example, the method 560 may be implemented in part using one or more processors, memory, processor-executable instructions, etc., which may provide for control of one or more actions of a system such as an additive manufacturing system that can include one or more pieces of equipment that can form an energy beam or energy beams.

FIG. 6 shows various example plots 600, individually labeled as plots 610, 620, 630, 640, 650 and 660 of mechanical property data for nanocomposites that include GNPs in TPE (610, 630 and 650) and PP matrices (620, 640 and 660). Additional details of the plots 600 can be found in the article by Young.

In FIG. 6, the plot 610 shows stress-strain curves for the TPE with different loadings of GNPs in parts per 100 parts of rubber (phr) and the plot 620 shows stress-strain curves for the PP with different loadings of GNPs in weight percent (wt %). In FIG. 6, the plot 630 shows dependence of the Young's modulus of the nanocomposite Ec upon volume fraction, Vf, for the TPE and the plot 640 shows dependence of Ec upon Vf for the PP. In FIG. 6, the plot 650 shows dependence of the 2D Raman band position upon strain for 20 phr of the GNPs in the TPE and the plot 660 shows dependence of the 2D Raman band position upon strain for Vf~10% of GNPs in the PP. The following equation may be utilized to estimate Ec, where Em is the Young's modulus of the matrix: Ec=EfVf+Em(1−Vf).

Figure 7:
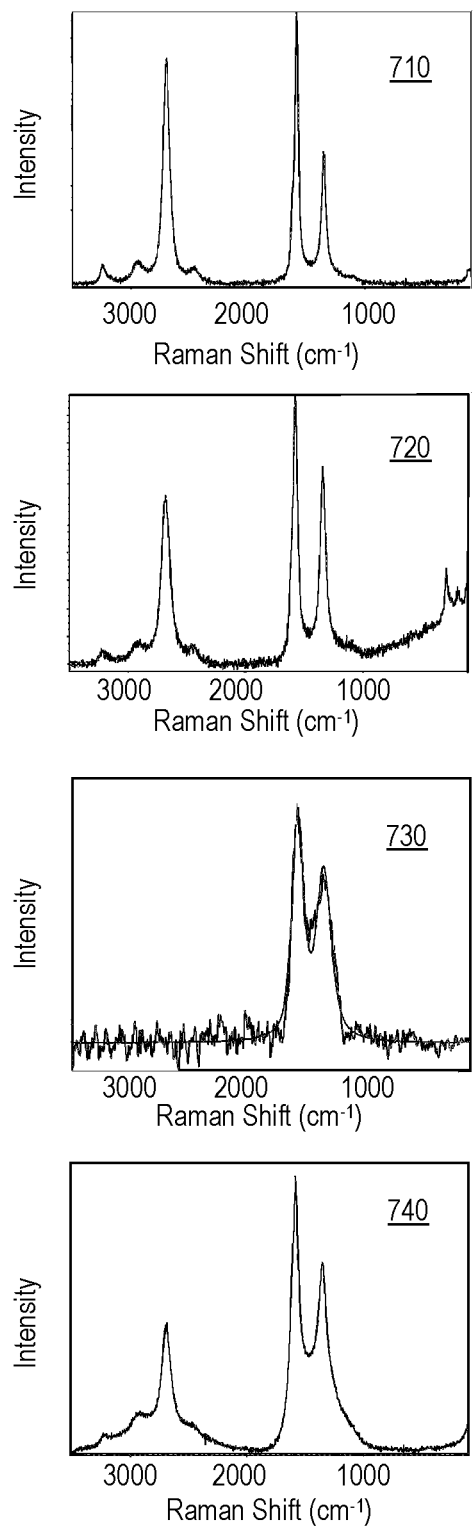
FIG. 7 illustrates Raman spectra and some examples of components.

FIG. 7 shows examples of Raman spectra 710, 720, 730 and 740 for some examples of materials that can be converted to graphene. Raman spectroscopy can be utilized as a non-destructive chemical analysis technique to provide information about chemical structure, phase and polymorphy, crystallinity and molecular interactions. A Raman spectrum (or Raman spectrograph) is based upon the interaction of light with the chemical bonds within a material. A Raman spectrum can feature a number of peaks, showing the intensity and wave number of the Raman scattered light. In such a spectrum, each peak can correspond to a specific molecular bond vibration, including individual bonds such as C—C, C=C, C—H etc., and groups of bonds such as breathing mode, polymer chain vibrations, lattice modes, etc.

Raman spectroscopy can be utilized to identify and characterize graphene. For example, Raman spectroscopy may be used to determine the number and orientation of layers, the quality and types of edge, and the effects of perturbations, such as electric and magnetic fields, strain, doping, disorder and functional groups. Such an approach may provide insight into $sp^2$-bonded carbon allotropes, because graphene is their fundamental building block.

In graphene, the Stokes phonon energy shift caused by laser excitation creates two main peaks in the Raman spectrum: G (1580 $cm^{-1}$), a primary in-plane vibrational mode, and 2D (2690 $cm^{-1}$), a second-order overtone of a different in-plane vibration, D (1350 $cm^{-1}$). In a spectrograph, D and 2D peak positions can be dispersive (e.g., dependent on the laser excitation energy). The foregoing positions cited are from a 532 nm excitation laser.

Referring again to the spectra 710, 720, 730 and 740 of FIG. 7, the spectrum 710 corresponds to graphene generated from PEEK (e.g., applied to a substrate as a spray coating), the spectrum 720 corresponds to graphene generated from PEEK/PPS-PFA (e.g., applied as a ceramic spray coating), the spectrum 730 corresponds to graphene generated by PPS-PTFE (e.g., applied as a ceramic spray coating), and the spectrum 740 corresponds to graphene generated by PEI (e.g., as deposited using an additive manufacturing technique).

As an example, one or more members of the PAEK family may be utilized to form a structure (e.g., as a coating, as a matrix, etc.). PEEK is within the PAEK family and is a semi-crystalline thermoplastic with a linear aromatic polymer structure where recyclable material melts at 343 degrees C. PEEK possesses mechanical properties with resistance to chemicals, wear, fatigue and creep even at relatively high operating temperatures. PEEK also has low moisture absorption, stable dielectric (insulating) properties and inherently low flammability. Processing options include injection molding, compression molding, and extrusion into shapes, film or fibers, to thermoforming, spray coating, or stock shape machining.

As an example, PEEK, alone or as a mixture, can be utilized for additive manufacturing (e.g., 3D printing, etc.). For example, consider an extruder that can operate with a temperature in excess of the melting temperature of PEEK. As an example, a method can include depositing PEEK on to a substrate, which may be a composite structure, where the substrate may be heated to a temperature that is suitable for deposited PEEK (e.g., for forming, control of solidification, etc.).

As an example, a fluid system component may be made at least in part of a polymer such as PEEK. For example, in some instances, PEEK can substitute for metal (e.g., metal, alloy, etc.). In such an example, carbon fibers, glass fibers, etc., may be included as structural reinforcements to provide strength and modulus properties akin to those of aluminum with a density that is lower than aluminum such that strength-to-weight ratio is increased compared to use of metal.

As mentioned, PI can be sensitive to water as hydrolytic attack may be possible depending on conditions. As an example, where water exposure is possible, a material other than PI may be utilized as a material that can be converted at least in part to graphene. As explained, various polymers possess particular properties that can differ. In various examples, a polymeric material may be selected to a pure, a mixture, etc., of one or more materials.

Figure 8:
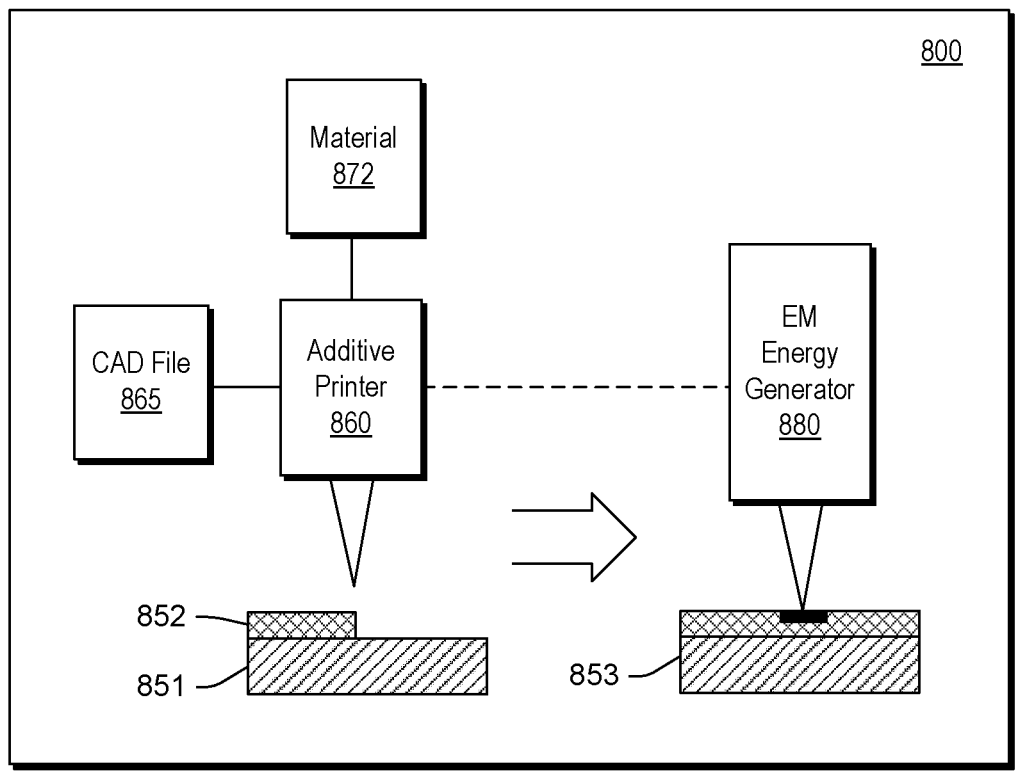
FIG. 8 illustrates an example of a method with respect to an example of a system.

FIG. 8 shows an example of a method 800 that includes depositing material 872 using an additive printer 860 onto a substrate 851 to form a layer 852 of the material 872, which may be spatially deposited according to instructions in a computer-aided design (CAD) file 865 (e.g., STL file, etc.), where an EM energy generator 880 can emit energy to convert at least a portion of the material 872 of the layer 852 into graphene to produce a composite 853. As an example, the CAD file 865 may be or include an STL file that includes STL types of instructions, etc. An STL file can include a triangulated representation of a multidimensional model, which may be a CAD model. In the example of FIG. 8, the CAD file 865 may include instructions that can instruct the EM energy generator 880 (e.g., and/or a gantry, etc., that can move the substrate 851 with the layer 852). As an example, an assembly may include a dual head for additive printing and for EM energy generation. For example, consider a dual head that can be controlled such that material can be deposited and at least a portion of the deposited material converted into graphene (e.g., in a desired pattern, etc.).

While the method 800 of FIG. 8 can include additive manufacture types of equipment, a method may involve one or more spray guns (e.g., paint type), one or more thermal scan units (e.g., one or more lasers), etc. As an example, a method may be iterative where multi-layer coatings can be applied.

Figure 9:
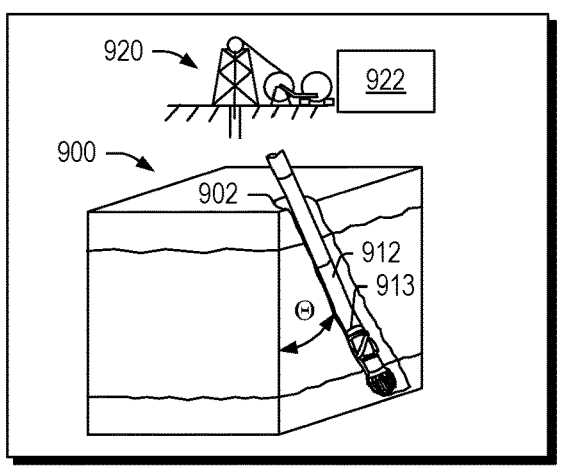
FIG. 9 illustrates examples of equipment.
Figure 9:
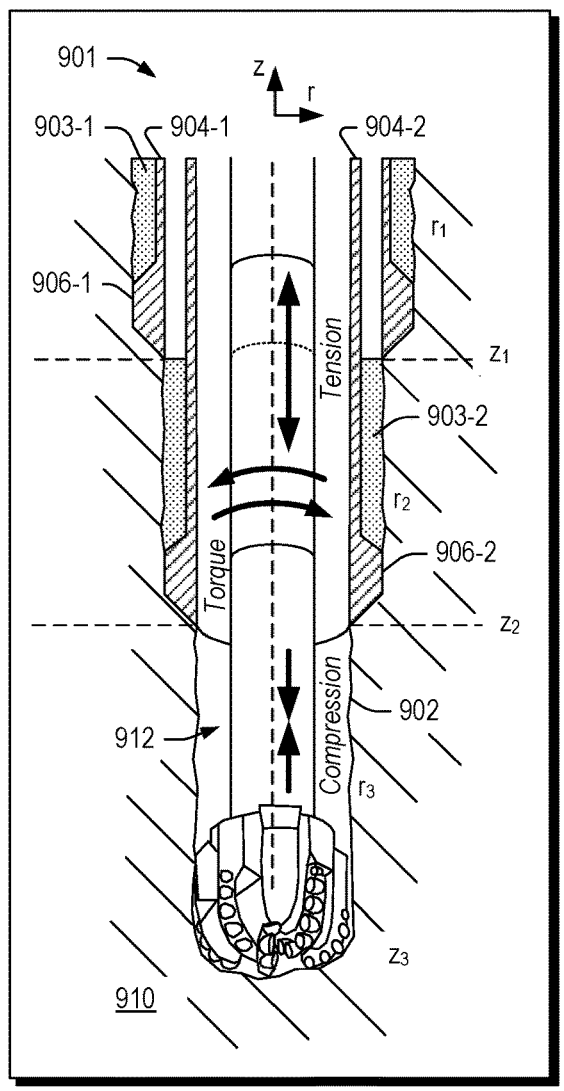
Figure 9:
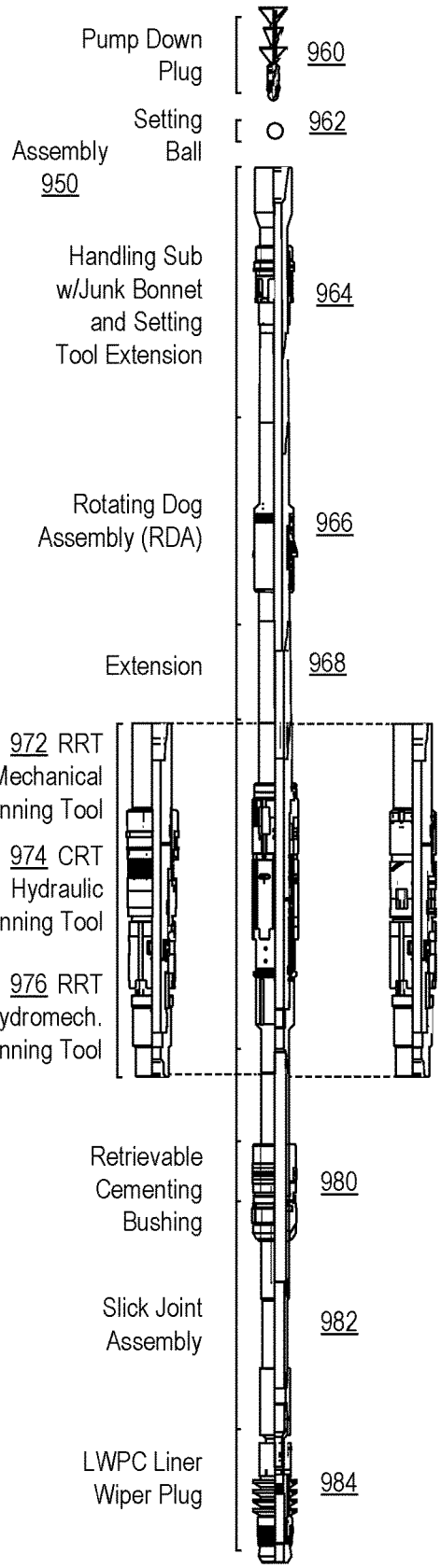
Figure 10:
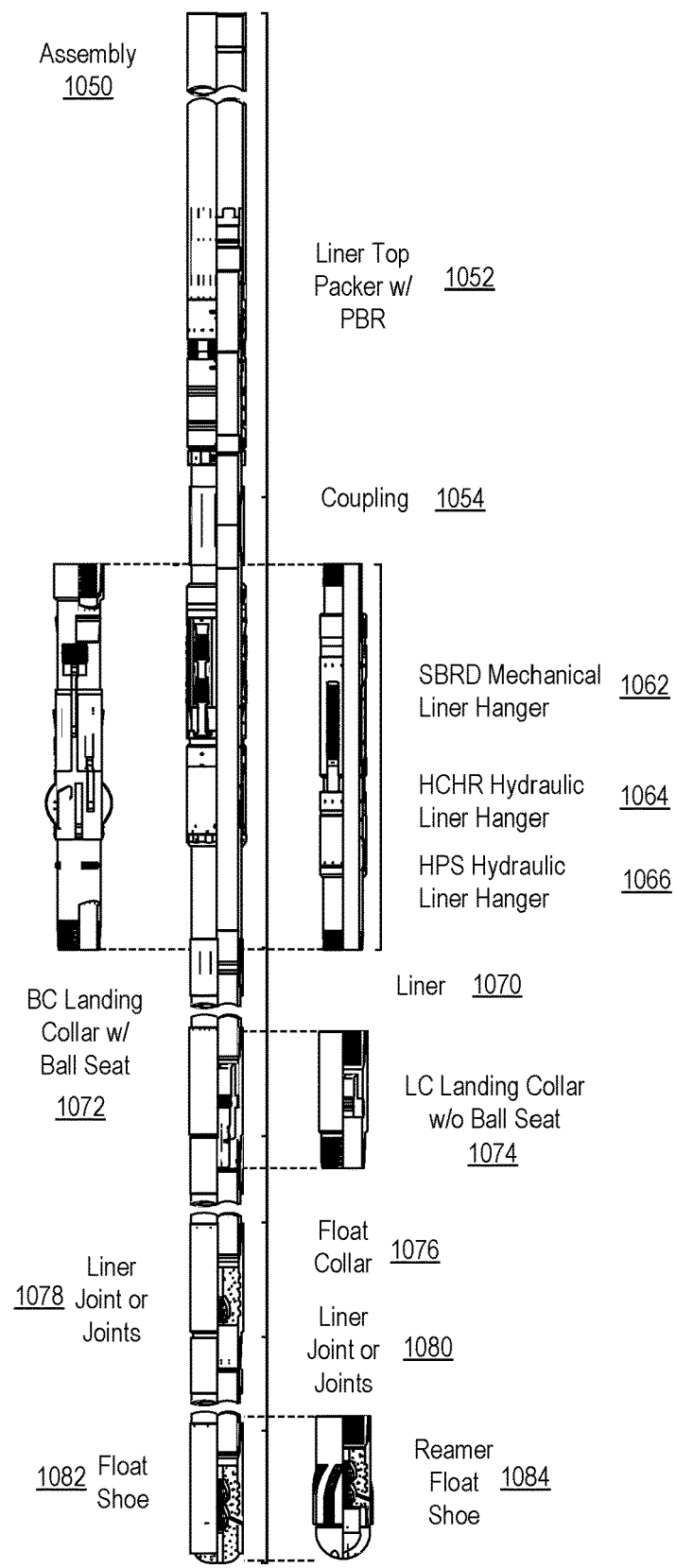
FIG. 10 illustrates examples of equipment.

FIGS. 9 and 10 show an example of an environment 900, an example of a portion of a completion 901, an example of equipment 920 and examples of assemblies 950 and 1050, which may be utilized in one or more completions operations. As an example, the equipment 920 may include a rig, a turntable, a pump, drilling equipment, pumping equipment, equipment for deploying an assembly, a part of an assembly, etc. As an example, the equipment 920 may include one or more controllers 922. As an example, a controller may include one or more processors, memory and instructions stored in memory that are executable by a processor, for example, to control one or more pieces of equipment (e.g., motors, pumps, sensors, etc.). As an example, the equipment 920 may be deployed at least in part at a well site and, optionally, in part at a remote site.

In FIG. 9, the environment 900 includes a subterranean formation into which a bore 902 extends where a tool 912 such as, for example, a drill string is disposed in the bore 902. As an example, the bore 902 may be defined in part by an angle (O); noting that while the bore 902 is shown as being deviated, it may be vertical (e.g., or include one or more vertical sections along with one or more deviated sections). As shown in an enlarged view with respect to an r, z coordinate system (e.g., a cylindrical coordinate system), a portion of the bore 902 includes casings 904-1 and 904-2 having casing shoes 906-1 and 906-2. As shown, cement annuli 903-1 and 903-2 are disposed between the bore 902 and the casings 904-1 and 904-2. Cement such as the cement annuli 903-1 and 903-2 can support and protect casings such as the casings 904-1 and 904-2 and when cement is disposed throughout various portions of a wellbore such as the wellbore 902, cement may help achieve zonal isolation (e.g., fluid isolation, etc.).

In the example of FIG. 9, the tool 912 can be a bottom hole assembly (BHA). A BHA is a lower portion of a drillstring that can include (e.g., from the bottom up) a bit, a bit sub, a mud motor (e.g., where desired), stabilizers, a drill collar, heavy-weight drillpipe, jarring devices ("jars"), and crossovers for various threadforms. The BHA provides force for the bit to break rock (e.g., via weight on bit, rotation, etc.) and is expected to survive a hostile mechanical environment and provide a driller with at least some directional control. A BHA can include a mud motor, directional drilling and measuring equipment, one or more measurements-while-drilling (MWD) tools, one or more logging-while-drilling (LWD) tools, etc. As shown, the tool 912 can include an antenna 913 that can be part of a measurement and/or logging tool. The antenna 913 can include one or more conductors and one or more protective layers.

In the example of FIG. 9, the bore 902 has been drilled in sections or segments beginning with a large diameter section (see, e.g., $r_1$) followed by an intermediate diameter section (see, e.g., $r_2$) and a smaller diameter section (see, e.g., $r_3$). As an example, a large diameter section may be a surface casing section, which may be three or more feet in diameter and extend down several hundred feet to several thousand feet. A surface casing section may aim to prevent washout of loose unconsolidated formations. As to an intermediate casing section, it may aim to isolate and protect high pressure zones, guard against lost circulation zones, etc. As an example, intermediate casing may be set at about 6000 feet (e.g., about 2000 m) and extend lower with one or more intermediate casing portions of decreasing diameter (e.g., in a range from about thirteen to about five inches in diameter). A so-called production casing section may extend below an intermediate casing section and, upon completion, be the longest running section within a wellbore (e.g., a production casing section may be thousands of feet in length). As an example, production casing may be located in a target zone where the casing is perforated for flow of fluid into a bore of the casing.

A liner may be a casing (e.g., a completion component) that may be installed via a liner hanger system. As an example, a liner hanger system may include various features such as, for example, one or more of the features of the assembly 950 and/or the assembly 1250 of FIGS. 9 and 12.

As shown in FIG. 9, the assembly 950 can include a pump down plug 960, a setting ball 962, a handling sub with a junk bonnet and setting tool extension 964, a rotating dog assembly (RDA) 966, an extension(s) 968, a mechanical running tool 972, a hydraulic running tool 974, a hydromechanical running tool 976, a retrievable cementing bushing 980, a slick joint assembly 982 and/or a liner wiper plug 984.

As shown in FIG. 10, the assembly 1050 can include a liner top packer with a polished bore receptacle (PBR) 1052, a coupling(s) 1054, a mechanical liner hanger 1062, a hydraulic liner hanger 1064, a hydraulic liner hanger 1066, a liner(s) 1070, a landing collar with a ball seat 1072, a landing collar without a ball seat 1074, a float collar 1076, a liner joint or joints 1078 and/or 1080, a float shoe 1082 and/or a reamer float shoe 1084.

One or more pieces of equipment of FIG. 9 or FIG. 10 can include graphene that has been formed in situ. As shown in FIG. 9, the tool 912 for a drilling operation may experience one or more of loads among tensile, compressive, and shear, as produced by a torque and differential pressures among burst and collapse. Where the tool 912 includes graphene in one or more of its polymeric components, the graphene may be present in a manner tailored to handle increase tension, compression, and shear. For example, consider a polymeric antenna, as used in formation evaluation (see, e.g., the antenna 913). Such an antenna can be molded in place around a section of a tubular (e.g., a MWD tool, a LWD tool, etc.) where the antenna can be used for one or more of a variety of measurements (e.g., borehole sonic, resistivity, nuclear, etc.). As explained, a downhole antenna can be exposed to harsh conditions, including wear and tear due to contacts with reservoir rock over a relatively long length of a well. Where an antenna includes at least a portion that includes in situ generated graphene, mechanical properties of the antenna can be tailored such that the antenna can have increased longevity due to improved resistance to wear and tear under downhole conditions.

As an example, a method can include setting a liner hanger, releasing a running tool, cementing a liner and setting a liner top packer. As an example, a method can include pumping heavy fluid (e.g., cement) down an annulus from a point above a liner hanger and a liner top packer. In such an example, stress on a formation may be reduced when compared to a method that pumps heavy fluid (e.g., cement) up such an annulus. For example, stress may be reduced as back pressure developed during pumping may be contained in between a casing and a landing string.

As an example, a production well may experience a decline in production (e.g., production rate as a fluid flow rate). In such an example, one or more techniques, technologies, etc., may be utilized to assist and/or enhance production (e.g., consider one or more enhance oil recovery (EOR) approaches, etc.). As an example, artificial lift technology may be utilized to assist production of fluid(s) from a well that is in fluid communication with a reservoir. Artificial lift technology can add energy to fluid to enhance production of the fluid. Artificial lift systems can include rod pumping systems, gas lift systems and electric submersible pump (ESP) systems. As an example, an artificial lift pumping system can utilize a surface power source to drive a downhole pump assembly. As an example, a beam and crank assembly may be utilized to create reciprocating motion in a sucker-rod string that connects to a downhole pump assembly. In such an example, the pump can include a plunger and valve assembly that converts the reciprocating motion to fluid movement (e.g., lifting the fluid against gravity, etc.). As an example, an artificial lift gas lift system can provide for injection of gas into production tubing to reduce the hydrostatic pressure of a fluid column. In such an example, a resulting reduction in pressure can allow reservoir fluid to enter a wellbore at a higher flow rate. A gas lift system can provide for conveying injection gas down a tubing-casing annulus where it can enter a production train through one or more gas-lift valves (e.g., a series of gas-lift valves, etc.). As an example, an electric submersible pump (ESP) can include a stack of impeller and diffuser stages where the impellers are operatively coupled to a shaft driven by an electric motor. As an example, an electric submersible pump (ESP) can include a piston that is operatively coupled to a shaft driven by an electric motor, for example, where at least a portion of the shaft may include one or more magnets and form part of the electric motor.

Examples of artificial lift equipment can include a gas lift (GL) system, a rod pumping (RP) system, and an ESP system. Such equipment may be disposed at least in part in a downhole environment to facilitate production of fluid; noting that a pump system (e.g., RP and/or ESP) may be utilized to move fluid to a location other than a surface location (e.g., consider injection to inject fluid into a subterranean region, etc.). A gas lift system operates at least in part on buoyancy as injected gas may be expected to rise due to buoyancy in a direction that is opposite gravity; whereas, a RP or an ESP may operate via mechanical movement of physical components to drive fluid in a desired direction, which may be with or against gravity.

Figure 11:
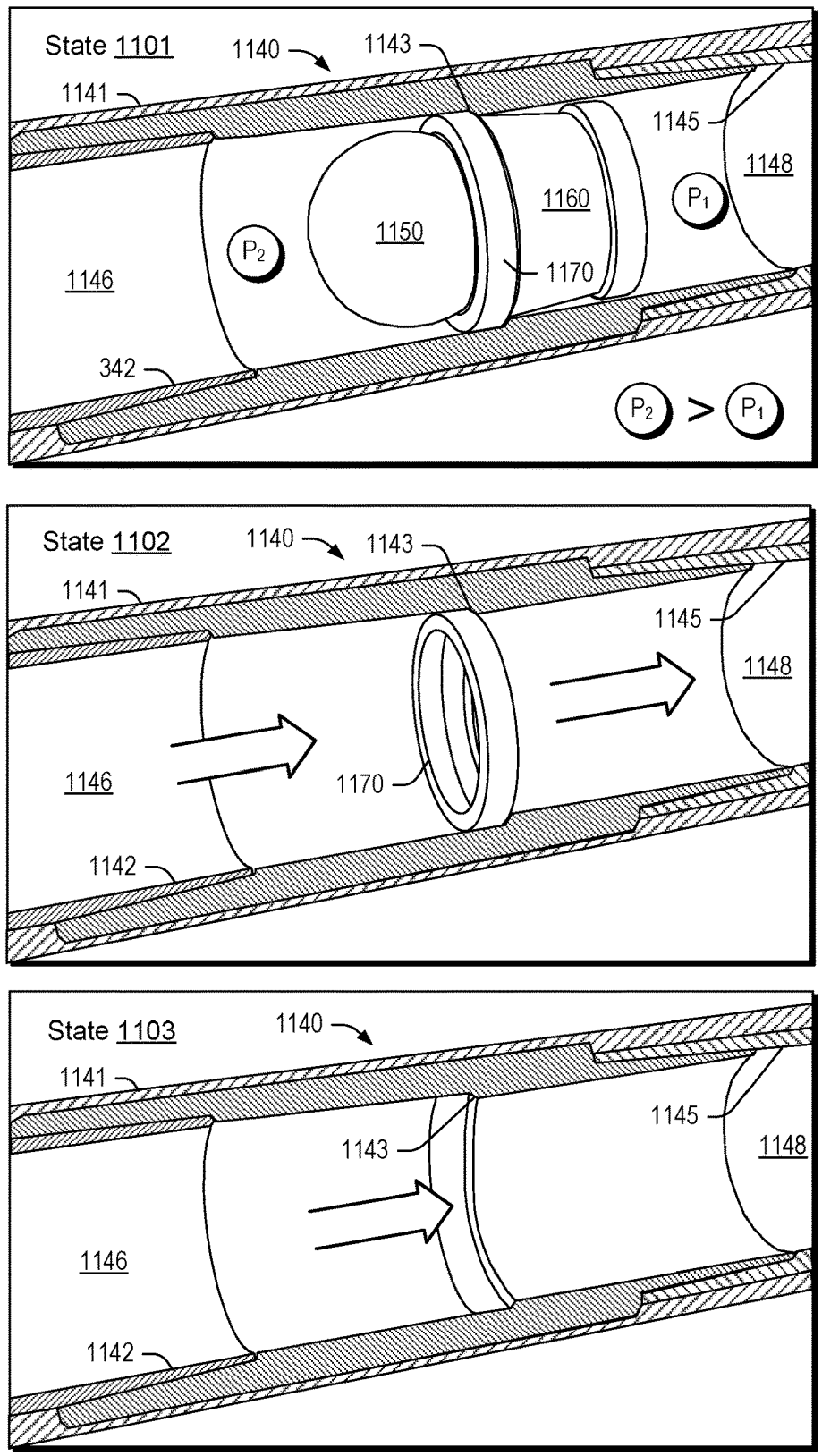
FIG. 11 illustrates examples of equipment.

FIG. 11 shows an example of equipment in various states 1101, 1102 and 1103. As shown, the equipment can include a casing 1140 that include various components 1141, 1142, 1143 and 1145. For example, the component 1142 may define a bore 1146 and the component 1145 may define a bore 1148 where the component 1143 includes features (e.g., reduced diameter, conical shape, receptacle, etc.) that can catch a ring component 1170 that is operatively coupled to a plug component 1160 where the ring component 1170 and the plug component 1160 may position and seat a plug 1150 in the casing 1140. As an example, a seal may be formed by the plug 1150 with respect to the plug component 1160 and/or the ring component 1170 and, for example, a seal may be formed by the ring component 1170 with respect to the component 1143. In such an approach, the seals may be formed in part via fluid pressure in a manner where increased pressure acts to increase seal integrity (e.g., reduce clearances that may be subject to leakage). As an example, the ring component 1170 may be an upper component (e.g., a proximal component) of a plug seat and the plug component 1160 may be a lower component (e.g., a distal component) of the plug seat.

As shown in the state 1101, the plug 1150 may be seated such that the bore 1146 (e.g., of a first zone) is separated (e.g., isolated) from the bore 1148 (e.g., of a second zone) such that fluid pressure in the bore 1146 (see, e.g., $P_2$) may be increased to a level beyond fluid pressure in the bore 1148 (see, e.g., $P_1$). Where the plug 1150 and the plug component 1160 are degradable, for example, upon contact with fluid that may pressurize the bore 1148, degradation of the plug 1150 and the plug component 1160 may transition the equipment from the state 1101 to the state 1102. As shown in the state 1102, fluid may pass from the bore 1146 to the bore 1148, for example, via an opening of the ring component 1170. Where the ring component 1170 is degradable, for example, upon contact with fluid in the bore 1146, degradation of the ring component 1170 may transition the equipment from the state 1102 to the state 1103. In the state 1103, the casing 1140 may be the remaining equipment of the state 1101 (e.g., the plug 1150, the plug component 1160 and the ring component 1170 are at least in part degraded).

As an example, the plug 1150, the plug component 1160 and the ring component 1170 may be components of a dissolvable plug and perforation system that may be used to isolate zones during stimulation. Such equipment may be implemented in, for example, cemented, uncemented, vertical, deviated, or horizontal bores (e.g., in shale, sandstone, dolomite, etc.).

As an example, the plug component 1160 and the ring component 1170 may be conveyed in a bore via a pump down operation (e.g., which may move the components 1160 and 1170 along a bore axis direction). As an example, a component or components may include adjustable features, for example, that allow a change in diameter to facilitate seating in a receptacle disposed in a bore. For example, a tool may interact with a component or components to cause a change in diameter or diameters (e.g., a change in form of one or more components). In the changed state, the component or components may catch and seat in a receptacle disposed in a bore (e.g., seat in a shoulder of a receptacle component).

As an example, the plug component 1160 and the ring component 1170 may be seated in a receptacle by a tool that may include one or more perforators. Once seated, the tool may be repositioned to perforate casing and form channels (e.g., in a layer or layers of rock). As an example, repositioning may occur multiple times, for example, to form multiple sets of perforations and multiple sets of channels. As an example, after perforating and channel formation, the plug 1150 may be pumped down to contact the plug component 1160 and/or the ring component 1170, for example, to form a seal that can isolate one zone from another zone (e.g., one interval from another interval). Fluid pressure may be increased in an isolated zone as defined by the plug 1150, the plug component 1160 and the ring component 1170 as positioned in a receptacle disposed in a bore such that the fluid enters channels via perforations of the isolated zone and generates fractures (e.g., new fractures, reactivated fractures, etc.).

As an example, a metal matrix composite (MMC) may be utilized as a support body as part of a component that may be a degradable component (e.g., a degradable downhole component, etc.).

Figure 12:
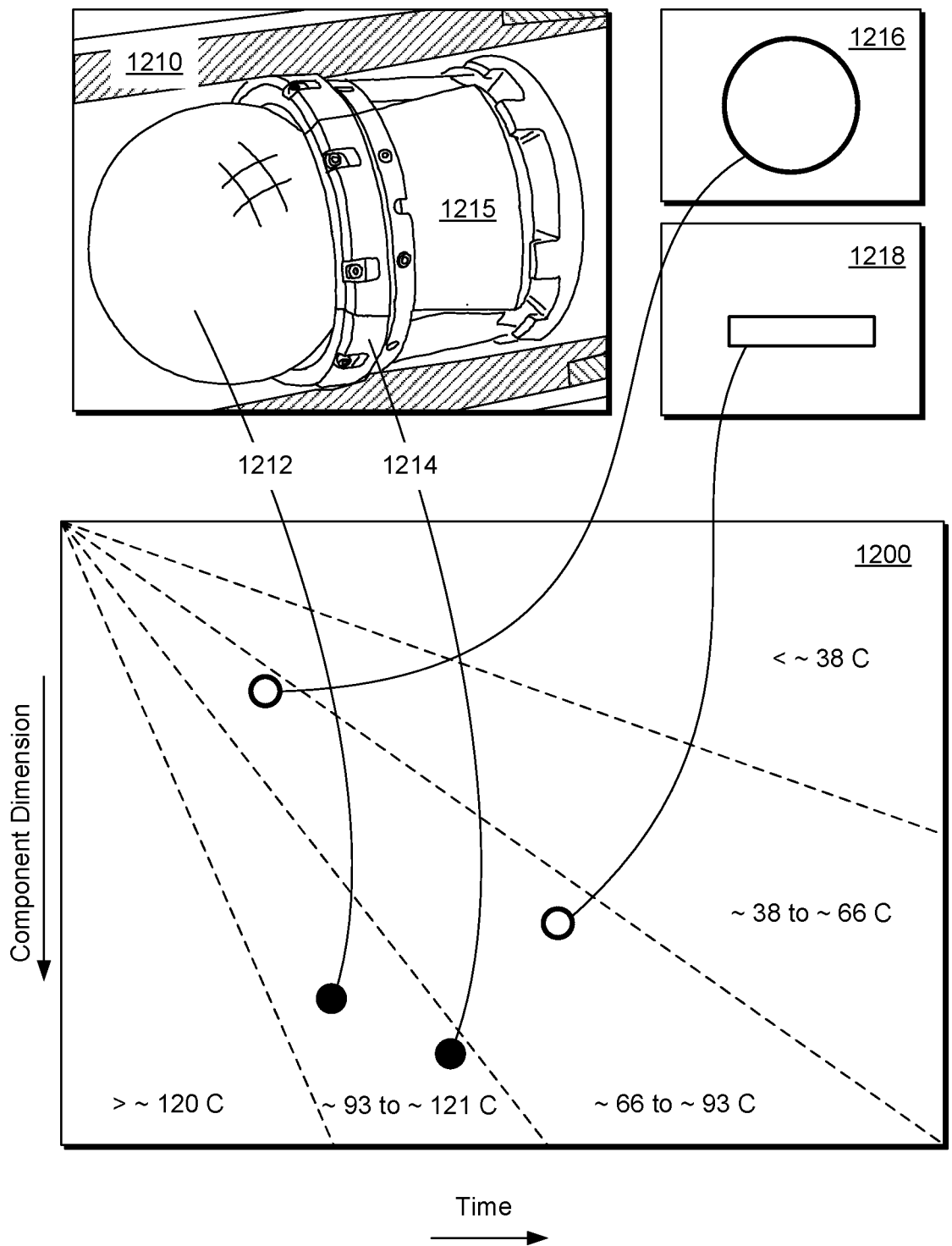
FIG. 12 illustrates examples of equipment and an example of a plot.

FIG. 12 shows an example plot 1200 of component dimension versus time of degradation for various temperatures and an example of an assembly 1210 that includes components 1212, 1214 and 1215 that may be made by consolidating particulate materials and example degradable polymeric materials 1216 and 1218, which may optionally be included in an assembly such as, for example, the assembly 1210.

As indicated, degradation of a component may be determined by a physical characteristic of the component and an environmental condition such as, for example, temperature. For example, fluid at a temperature of about 120 degrees C. may cause a component to degrade more rapidly than fluid at a temperature of about 66 degrees C. As an example, a component may be constructed to include one or more layers where at least one layer includes a degradable material, which may include a dimension (e.g., thickness, etc.) that is based at least in part on information such as the information of the plot 1200 of FIG. 12. As an example, a layer may be a degradable polymeric material layer. As an example, a layer may be or include a degradable graphene region. In such an example, degradation of a matrix material may result in release of material such as graphene where such material is relatively small in size and can flow in a fluid stream with minimal risk of plugging an opening (e.g., a port, a perforation, etc.).

As an example, the assembly 1210 may include one component that degrades at a rate that differs from another component. For example, the plug component 1212 (e.g., a ball, etc.) may degrade more rapidly than the plug seat component 1214 (e.g., a ring that can include a plug seat and that may act to locate the plug seat). As shown in FIG. 12, the assembly 1210 can include a plurality of pieces where such pieces may be formed according to desired dissolution rate, strength and/or ductility.

One or more pieces of equipment of FIG. 11 or FIG. 12 can include graphene as formed in situ where the graphene may tailor one or more characteristics of the one or more pieces of equipment (e.g., responsive to force, degradation, etc.). Graphene may be included in a dissolvable polymer ball or another dissolvable component where the graphene acts to increase operational range, which may be defined by a maximum pressure at a specified temperature or temperature range. As an example, graphene may be part of a seat where the seat has tailored mechanical properties via inclusion of the graphene.

As an example, an additively manufactured product can include graphene where the product is designed and fabricated layer-by-layer in a manner that promotes failure of the seat into smaller pieces of debris, for instance by concentrating more graphene in specific regions of a component. As an example, debris size and/or debris size distribution may be tailored through utilization of in situ generated graphene. For example, consider utilization of a pattern where the pattern can define boundaries for regions of a component where the component breaks into the regions, which may be of a desired size or sizes.

Useful polymer materials for ball/seat drop systems include phenolic constituents, polyamide-imide, PEEK, etc. As an example, one or more of a variety of thermoplastics pre-selected for strength and stiffness at temperature may be utilized. In cases, where ball/seat systems are to be made dissolvable, polymer materials such as, for example, polylactic acid (PLA), polyglycolic acid (PGA), and poly(lactic-co-glycolic) acid (PLGA) can be used.

Figure 13:
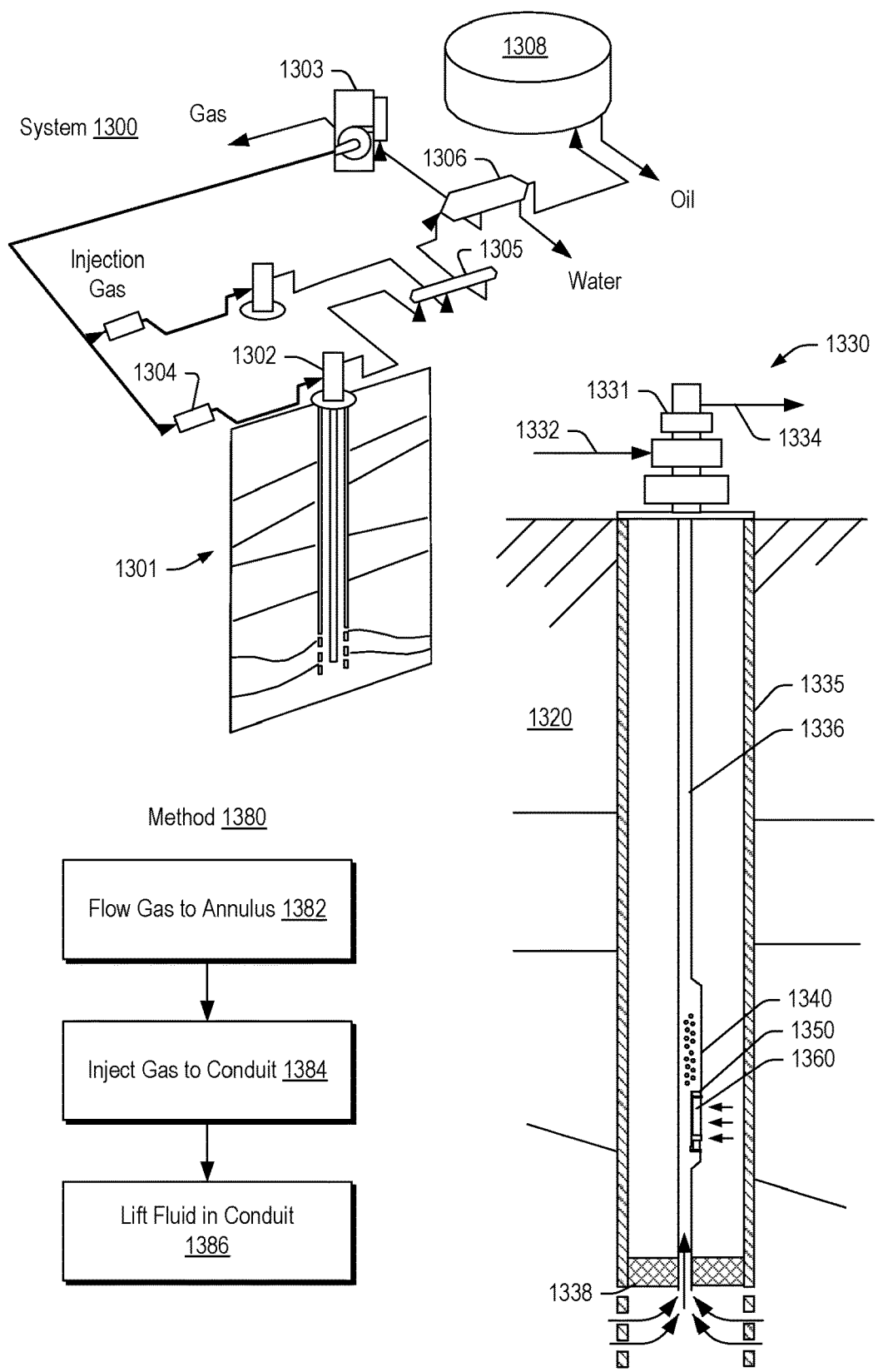
FIG. 13 illustrates an example of a system and an example of a method.

FIG. 13 shows an example of a system 1300 that includes various types of equipment where at least some of the equipment may scale and/or affect a scaling mechanism. For example, gas lift equipment can experience scale formation and, for example, may alter one or more of pressure, temperature, chemistry, phase dynamics, etc. In the example of FIG. 13, various fluid system components are at surface and various fluid system components are subsurface; noting that various fluid system component can extend from a position that is subsurface to a position that is at surface.

In FIG. 13, the system 1300 is shown with an example of a geologic environment 1320 that includes equipment and an example of a method 1380. The system 1300 includes a subterranean formation 1301 with a well 1302. Injection gas is provided to the well 1302 via a compressor 1303 (e.g., a fluid pump, etc.) and a regulator 1304 (e.g., a fluid controller). The injection gas can assist with lifting fluid that flows from the subterranean formation 1301 to the well 1302. The lifted fluid, including injected gas, may flow to a manifold 1305 (e.g., a fluid system component with multiple fluid inlets and/or fluid outlets), for example, where fluid from a number of wells may be combined. As shown in the example of FIG. 13, the manifold 1305 is operatively coupled to a separator 1306, which may separate components of the fluid. For example, the separator 1306 may separate oil, water and gas components as substantially separate phases of a multiphase fluid. In such an example, oil may be directed to an oil storage facility 1308 via tubing while gas may be directed to the compressor 1303 via tubing, for example, for re-injection, storage and/or transport to another location. As an example, water may be directed to a water discharge, a water storage facility, etc.

As shown in FIG. 13, the geologic environment 1320 is fitted with well equipment 1330, which includes a well-head 1331 (e.g., a Christmas tree, etc.), an inlet conduit 1332 for flow of compressed gas, an outlet conduit 1334 for flow of produced fluid, a casing 1335, a production conduit 1336, and a packer 1338 that forms a seal between the casing 1335 and the production conduit 1336. As shown, fluid may enter the casing 1335 (e.g., via perforations) and then enter a lumen of the production conduit 1336, for example, due to a pressure differential between the fluid in the subterranean geologic environment 1320 and the lumen of the production conduit 1336 at an opening of the production conduit 1336.

Where the inlet conduit 1332 for flow of compressed gas is used to flow gas to the annular space between the casing 1335 and the production conduit 1336, a mandrel 1340 operatively coupled to the production conduit 1336 that includes a pocket 1350 that seats a gas lift valve 1360 that may regulate the introduction of the compressed gas into the lumen of the production conduit 1336. In such an example, the compressed gas introduced may facilitate flow of fluid upwardly to the well-head 1331 (e.g., opposite a direction of gravity) where the fluid may be directed away from the well-head 1331 via the outlet conduit 1334.

As shown in FIG. 13, the method 1380 can include a flow block 1382 for flowing gas to an annulus (e.g., or, more generally, a space exterior to a production conduit fitted with a gas lift valve), an injection block 1384 for injecting gas from the annulus into a production conduit via a gas lift valve or gas lift valves and a lift block 286 for lifting fluid in the production conduit due in part to buoyancy imparted by the injected gas.

As an example, a production process may optionally utilize one or more fluid pumps such as, for example, an electric submersible pump (e.g., consider a centrifugal pump, a rod pump, etc.). As an example, a production process may implement one or more so-called "artificial lift" technologies. An artificial lift technology may operate by adding energy to fluid, for example, to initiate, enhance, etc. production of fluid.

Figure 14:
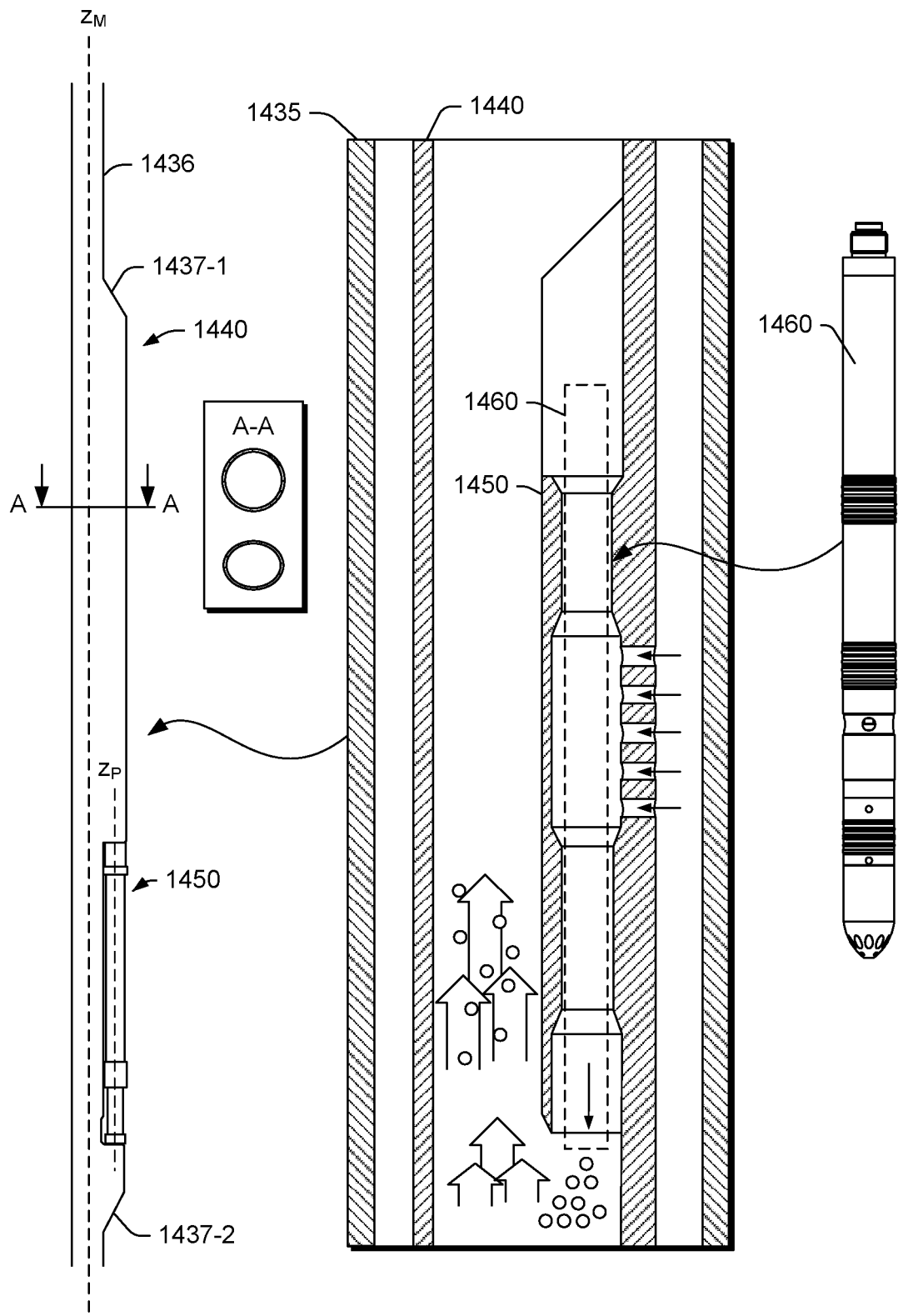
FIG. 14 illustrates an example of a system.

FIG. 14 shows an example of a system 1400 that includes a casing 1435, a production conduit 1436 and a mandrel 1440 that includes a pocket 1450 that seats a gas lift valve 1460. As shown, the mandrel 1440 can include a main longitudinal axis ($Z_M$) and a side pocket longitudinal axis ($Z_P$) that is offset a radial distance from the main longitudinal axis ($Z_M$). In the example of FIG. 14, the axes ($Z_M$ and $Z_P$) are shown as being substantially parallel such that a bore of the pocket 1450 is parallel to a lumen of the mandrel 1440. Also shown in FIG. 14 are two examples of cross-sectional profiles for the mandrel 1440, for example, along a line A-A. As shown, a mandrel may include a circular cross-sectional profile or another shaped profile such as, for example, an oval profile.

As an example, a completion may include multiple instances of the mandrel 1440, for example, where each pocket of each instance may include a gas lift valve where, for example, one or more of the gas lift valves may differ in one or more characteristics from one or more other of the gas lift valves (e.g., pressure settings, etc.).

As shown in the example of FIG. 14, the mandrel 1440 can include one or more openings that provide for fluid communication with fluid in an annulus (e.g., gas and/or other fluid), defined by an outer surface of the mandrel 1440 and an inner surface of the casing 1435, via a gas lift valve 1460 disposed in the pocket 1450. For example, the gas lift valve 1460 may be disposed in the pocket 1450 where a portion of the gas lift valve 1460 is in fluid communication with an annulus (e.g., with casing fluid) and where a portion of the gas lift valve 1460 is in fluid communication with a lumen (e.g., with tubing fluid). In such an example, fluid may flow from the annulus to the lumen (e.g., bore) to assist with lift of fluid in the lumen or, for example, fluid may flow from the lumen to the annulus. The pocket 1450 may include an opening that may be oriented downhole and one or more openings that may be oriented in a pocket wall, for example, directed radially to a lumen space. As an example, the pocket 1450 may include a production conduit lumen side opening (e.g., an axial opening) for placement, retrieval, replacement, adjustment, etc. of a gas lift valve. For example, through use of a tool, the gas lift valve 1460 may be accessed. As an example, where a gas lift valve includes circuitry such as a battery or batteries, a tool may optionally provide for charging and/or replacement of a battery or batteries.

In the example of FIG. 14, gas is illustrated as entering from the annulus to the gas lift valve 1460 as disposed in the pocket 1450. Such gas can exit at a downhole end of the gas lift valve 1460 where the gas can assist in lifting fluid in the lumen of the mandrel 1440 (e.g., as supplied via a bore of production tubing, etc.).

As an example, a side pocket mandrel may be configured with particular dimensions, for example, according to one or more dimensions of commercially available equipment. As an example, a side pocket mandrel may be defined in part by a tubing dimension (e.g., tubing size). For example, consider tubing sizes of about 2.375 in (e.g., about 60 mm), of about 2.875 in (e.g., about 73 mm) and of about 3.5 in (e.g., about 89 mm). As to types of valves that may be suitable for installation in a side pocket mandrel, consider dummy valves, shear orifice valves, circulating valves, chemical injection valves and waterflood flow regulator valves. As an example, a side pocket may include a bore configured for receipt of a device that includes an outer diameter of about 1 in (e.g., about 25 mm), or about 1.5 in. (e.g., about 37 mm) or more. As mentioned, a running tool, a pulling tool, a kickover tool, etc. may be used for purposes of installation, retrieval, adjustment, etc. of a device with respect to a side pocket. As an example, a tool may be positioned via a slickline technique.

As an example, a side pocket mandrel may include a circular and/or an oval cross-sectional profile (e.g., or other shaped profile). As an example, a side pocket mandrel may include an exhaust port (e.g., at a downhole end of a side pocket).

As an example, a mandrel may be fit with a gas lift valve that may be, for example, a valve according to one or more specifications such as an injection pressure-operated (IPO) valve specification. As an example, a positive-sealing check valve may be used such as a valve qualified to meet API-19G1 and G2 industry standards and pressure barrier qualifications. For example, with a test pressure rating of about 10,000 psi (e.g., about 69,000 kPa), a valve may form a metal-to-metal barrier between production tubing and a casing annulus that may help to avoid undesired communication (e.g., or reverse flow) and to help mitigate risks associated with gas lift valve check systems.

One or more pieces of equipment of FIG. 13 or FIG. 14 can include graphene as formed in situ to tailor one or more physical properties of the one or more pieces of equipment (e.g., responsive to force, degradation, etc.).

Figure 15:
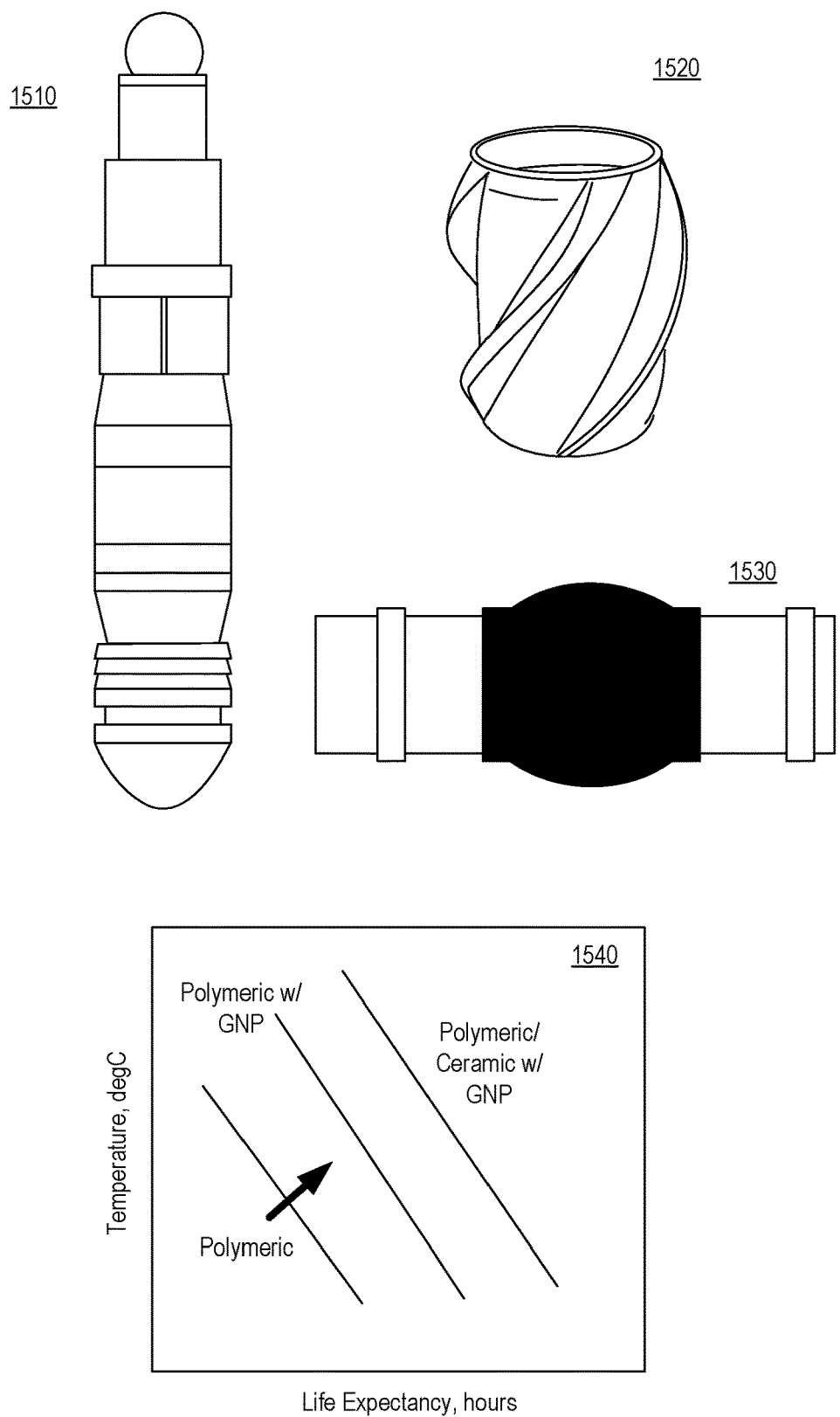
FIG. 15 illustrates examples of equipment and an example of a plot for equipment characteristics.

FIG. 15 shows examples of equipment 1510, 1520 and 1530 and an example plot 1540. As shown, the equipment 1510 is a frac plug with a frac ball where one or more pieces can include graphene formed in situ, where the equipment 1520 is a centralizer with a spiral blade where one or more features of the centralizer can include graphene formed in situ, and where the equipment 1530 is a cementing tool with a composite material that can include graphene formed in situ.

The plot 1540 shows life expectancy for temperature where increasing temperature results in decreased life expectancy. In the plot 1540, polymeric components without graphene can have the lowest operating range with respect to temperature and the shortest life expectancy. Where graphene is introduced, at least in part via in situ generation during an additive manufacture process, the operating range increases along with life expectancy. As shown in the plot 1540, a further increase may be achieved for a component that includes ceramic and in situ graphene as generated in situ during an additive manufacture process from polymeric material.

As an example, one or more pieces of equipment in the examples of FIGS. 9, 10, 11, 12, 13, 14 and 15 may include graphene as converted from a polymeric material. For example, consider one or more of the materials 130, 132, 134, and 136 as in FIG. 1, products 214, 234 and 254 of FIG. 2, the part 420 of FIG. 4, the one or more layers 501, 502, 503, 504 and 505 of FIG. 5, one or more of the materials in the plots 610, 620, 630, 640, 650 and 660 of FIG. 6, one or more of the materials in the plots 710, 720, 730 and 740 of FIG. 7, one or more of the materials of the layers 851, 852 and 853 of FIG. 8, etc., being included in one or more of the pieces of equipment in the examples of FIGS. 9, 10, 11, 12, 13, 14 and 15. As an example, a surface component and/or a subsurface component (e.g., a downhole component, etc.) may include graphene as formed in situ.

As an example, a fluid system component can include a body that includes a multidimensional shape defined in orthogonal directions and layers stacked along one of the orthogonal directions, where at least one of the layers includes polymeric material and graphene nanoplatelets formed from the polymeric material, and where the graphene nanoplatelets increase stiffness of the polymeric material. In such an example, the graphene nanoplatelets can be oriented in a direction substantially parallel to the layers to increase stiffness of the polymeric material responsive to applied stress in the direction. For example, consider generation of graphene nanoplatelets to form geometric patterns that are oriented in a direction substantially parallel to layers to increase stiffness of polymeric material responsive to applied stress in the direction. As explained, AM equipment and beam direction equipment can provide for control of how material is deposited and/or generated. Such equipment may be operable in a relatively precise manner (e.g., consider sub-millimeter accuracy, consider millimeter accuracy for a component with a maximum diameter of 10 cm, consider several millimeter accuracy for a component with a maximum diameter of 30 cm, etc.).

As an example, a polymeric material can include an aromatic polymeric material that can be converted to graphene (e.g., GNPs).

As an example, a fluid system component can include graphene nanoplatelets form a matrix that includes pore space. In such an example, polymeric material or a different polymeric material can occupy at least a portion of the pore space.

As an example, a fluid system component can include a body that includes a multidimensional shape defined in orthogonal directions and layers stacked along one of the orthogonal directions, where at least one of the layers includes polymeric material and graphene nanoplatelets formed from the polymeric material, and where the graphene nanoplatelets increase stiffness of the polymeric material. In such an example, the at least one of the layers can include a different polymeric material.

As an example, a fluid system component can include a multidimensional shape that includes a cylindrical shape defined at least in part by an axial direction and a radial direction as two orthogonal directions.

As an example, a fluid system component can include a body that includes a degradable material that degrades upon exposure to water. For example, consider a dissolvable material. In such an example, graphene may increase stiffness in various regions, which may lead to breaking of the fluid system component into particular shapes, sizes, etc., of debris, responsive to exposure to water, a change in pressure, a change in temperature, etc.

As an example, a fluid system component can include graphene nanoplatelets formed from polymeric material such that the graphene nanoplatelets form a pattern. In such an example, the pattern can correspond to a stiffness analysis pattern for the fluid system component. For example, consider a FEA approach that utilizes a virtual model (e.g., a computational mesh model, etc.) to perform computational simulation(s) to generate results indicative of spatial distribution of behavior(s) of a fluid system component (see, e.g., the virtual model 420 of FIG. 4, etc.).

As an example, a method can include depositing polymeric material; selectively exposing the polymeric material to an energy beam; responsive to the exposing, converting at least a portion of the polymeric material to graphene nanoplatelets; and depositing additional material on the graphene nanoplatelets to form at least a portion of a component. In such an example, the depositing may utilize one or more polymeric materials and selectively exposing may include exposing one or more of the one or more polymeric materials to an energy beam or energy beams.

As an example, a method can include building up, layer-by-layer, a polymeric material physically or chemically by depositing material. In such an example, deposition of material may be concurrent to an energy input that can convert at least a portion of the polymeric material to graphene.

As an example, a method can include polymerizing such as, for example, photopolymerizing and/or one or more other types of polymerizing. As an example, polymer may be formed from a liquid polymer and/or monomer bath, for example, as exposed to UV radiation and/or other energy.

As an example, a method can include exposing built up polymeric material to energy for converting at least a portion of the polymeric material to graphene nanoplatelets. In such an example, the method can include depositing additional material on the graphene nanoplatelets to form at least a portion of a component.

As an example, a method can include exposing polymeric material to energy where the energy can be emitted by a laser. For example, consider one or more lasers that can generate one or more laser beams.

As an example, a method can include controlling a polymerization reaction of polymeric material (e.g., polymer, monomer, additives, etc.). In such an example, one technique may be utilized to control polymerization and another technique utilized to control generation of graphene in situ.

As an example, a method can include making a fluid system component that includes multiple layers. In such an example, at least one of the multiple layers can include graphene nanoplatelets that are formed in situ.

As an example, a method can include orienting graphene nanoplatelets. For example, consider flowing material where such flowing can cause movement of graphene nanoplatelets where force or forces cause the movement to orient the graphene nanoplatelets (e.g., along flow streamlines, etc.).

As an example, a method can include exposing polymeric material according to a pattern to form a pattern of graphene nanoplatelets. For example, consider a component where graphene nanoplatelets are arranged according to a pattern. In such an example, the pattern can correspond to a predetermined stiffness analysis pattern. For example, consider determining a stiffness analysis pattern using a computational stress analysis framework and then using the stiffness analysis pattern in building a component.

As an example, a method can include applying heat, pressure or heat and pressure to the at least a portion of a component that include in situ generated graphene.

As explained, a method can include additively manufacturing a part/component where the method includes depositing a precursor material including one or more polymers using an additive manufacturing technology. In such an example, the precursor material may be deposited using extrusion (see, e.g., examples 210, 230 and 250 of FIG. 2).

As an example, a method can include generating graphene from a deposited precursor material, for example, by applying one or more energy source(s), localized or semi-localized, to induce graphene (e.g., consider laser radiation, micro-plasma, E-beam, etc.)

As explained, a laser may be a gas laser, a diode laser or another type of laser. As to a $CO_2$ laser, consider a laser with a power of approximately 1 W to 10 W or more, which may be controlled via a gantry, a motorized gimbal, or another positioning mechanism. As an example, a diode laser may have a power from approximately 1 W to 20 W or more. As an example, optics may be provided for one or more purposes. For example, consider focus, beam size, beam splitting, etc.

As explained, a polymeric material can be a photocuring or photo-responsive polymeric material (e.g., including a nano polymer alloy). As an example, a method can include use of appropriate wavelength radiation, which may include infrared to ultraviolet, which may include non-lasing radiation. As an example, a UV source may be utilized to initiate or otherwise control a UV curable polymeric material.

As an example, a method can include forming a component that is then subjected to one or more other procedures. For example, consider applying one or more of heat and pressure in a post-additive manufacturing process. Such an approach may be utilized, for example, in a local and/or global manner to reduce defects and/or improve consolidation, etc. As mentioned, a green component may be formed that can be further processed, for example, via heat (e.g., consider placement in an oven, etc.).

As an example, a polymeric precursor material can include one or more of PEEK, PEK, PEI, and one or more photocuring materials.

As an example, an additive manufacturing process can include depositing material in a macroscopically uniform manner where energy is utilized to covert at least a portion of the deposited material to graphene, for example, to generate discontinuous, semi-continuous or continuous graphene. As explained, graphene may be generated to conform to a pattern, which may be determined a priori, for example, according to one or more types of analyses (e.g., FEA, etc.).

As an example, an additive manufacturing process may deposit precursor material in a non-uniform manner, which may be evolving in three-dimensions. In such an example, energy can be applied to covert at least a portion of the precursor material to graphene. As explained, a pattern may be generated that may, for example, provide for tailored properties to handle asymmetric mechanical loads and/or asymmetric thermal loads.

As an example, a component can be an oilfield component that may be suitable for surface and/or downhole use. As to downhole use, a downhole environment can be harsher than a surface environment and deployment, retrieval, etc., in a downhole environment can involve mechanical forces such as, for example, contact with a borewall (e.g., rock, mud, etc.) and/or one or more other components (e.g., casing, a seat, etc.). A component may be, for example, a fluid transport/flow component (e.g., a pipe, a tubular stock, a coupling stock (e.g., a composite, etc.), a crossover, a housing for drilling, production, etc. As to fluid zone isolation and/or blockage and/or control, a component may be a bridge plug (e.g., a composite bridge plug, etc.), an oilfield ball or a dart plugs (e.g., for hydraulic fracturing, cementing, etc.), a sealing element (e.g., a packer, a liner hanger), a bulkhead, a cap, etc. As to pressure bearing components, consider one or more of a housing, a pressure vessel, a bulkhead, etc. As to nuclear measurements, a component may be a window material that is part of a downhole tool that can acquire nuclear measurements (e.g., of rock that forms or surrounds a borehole, etc.). As an example, a downhole tool may be a drillstring tool or a wireline tool. As to mechanical transmission components, a component may be a rod (e.g., a sucker rod pump), a shaft, a rotor or a stator. As to mechanical control and positioning, consider a component that is at least part of a centralizer. As an example, a component may be a sucker rod component, a cementing component, a sand screen, etc.

CONCLUSION

Although only a few examples have been described in detail above, those skilled in the art will readily appreciate that many modifications are possible in the examples. Accordingly, all such modifications are intended to be included within the scope of this disclosure as defined in the following claims. In the claims, means-plus-function clauses are intended to cover the structures described herein as performing the recited function and not only structural equivalents, but also equivalent structures. Thus, although a nail and a screw may not be structural equivalents in that a nail employs a cylindrical surface to secure wooden parts together, whereas a screw employs a helical surface, in the environment of fastening wooden parts, a nail and a screw may be equivalent structures.

What is claimed is:

1. A fluid system component comprising:
a body that comprises a multidimensional shape defined in orthogonal directions and layers stacked along one of the orthogonal directions, wherein at least one of the layers comprises polymeric material and graphene nanoplatelets formed from the polymeric material, wherein the graphene nanoplatelets increase stiffness of the polymeric material, and wherein the graphene nanoplatelets form geometric patterns that are oriented in a direction substantially parallel to the layers to increase stiffness of the polymeric material responsive to applied stress in the direction.

2. The fluid system component of claim 1, wherein the polymeric material comprises an aromatic polymeric material.

3. The fluid system component of claim 1, wherein the graphene nanoplatelets form a matrix that comprises pore space.

4. The fluid system component of claim 3, wherein the polymeric material or a different polymeric material occupies at least a portion of the pore space.

5. The fluid system component of claim 1, wherein at least one of the layers comprises a different polymeric material.

6. The fluid system component of claim 1, wherein the multidimensional shape comprises a cylindrical shape defined at least in part by an axial direction and a radial direction as two of the orthogonal directions.

7. The fluid system component of claim 1, wherein the body further comprises a degradable material that degrades upon exposure to water.

8. A fluid system component comprising:
a body that comprises a multidimensional shape defined in orthogonal directions and layers stacked along one of the orthogonal directions, wherein at least one of the layers comprises polymeric material and graphene nanoplatelets formed from the polymeric material, wherein the polymeric material comprises an aromatic polymeric material, wherein the graphene nanoplatelets increase stiffness of the polymeric material, and wherein the graphene nanoplatelets form a matrix that comprises pore space.

9. The fluid system component of claim 8, wherein the graphene nanoplatelets form geometric patterns that are oriented in a direction substantially parallel to the layers to increase stiffness of the polymeric material responsive to applied stress in the direction.

10. The fluid system component of claim 8, wherein the polymeric material or a different polymeric material occupies at least a portion of the pore space.

11. The fluid system component of claim 8, wherein at least one of the layers comprises a different polymeric material.

12. The fluid system component of claim 8, wherein the multidimensional shape comprises a cylindrical shape defined at least in part by an axial direction and a radial direction as two of the orthogonal directions.

13. The fluid system component of claim 8, wherein the body further comprises a degradable material that degrades upon exposure to water.

14. The fluid system component of claim 8, wherein the graphene nanoplatelets formed from the polymeric material form a pattern, wherein the pattern corresponds to a stiffness analysis pattern for the body.

* * * * *